(12) United States Patent
Sterle et al.

(10) Patent No.: US 12,576,589 B2
(45) Date of Patent: Mar. 17, 2026

(54) PRINT AND RECOAT ASSEMBLIES FOR ADDITIVE MANUFACTURING SYSTEMS AND METHODS FOR USING THE SAME

(71) Applicant: General Electric Company, Schenectady, NY (US)

(72) Inventors: John Sterle, Clifton Park, NY (US); Vadim Bromberg, Niskayuna, NY (US); Carlos H. Bonilla, Lebanon, OH (US); Tyler Andrew Griffith, West Chester, OH (US)

(73) Assignee: General Electric Company, Evendale, OH (US)

( * ) Notice: Subject to any disclaimer, the term of this patent is extended or adjusted under 35 U.S.C. 154(b) by 269 days.

(21) Appl. No.: 18/032,259

(22) PCT Filed: Oct. 18, 2021

(86) PCT No.: PCT/US2021/055458
§ 371 (c)(1),
(2) Date: Apr. 17, 2023

(87) PCT Pub. No.: WO2022/086868
PCT Pub. Date: Apr. 28, 2022

(65) Prior Publication Data
US 2023/0398740 A1      Dec. 14, 2023

Related U.S. Application Data

(60) Provisional application No. 63/093,933, filed on Oct. 20, 2020.

(51) Int. Cl.
*B29C 64/295*        (2017.01)
*B29C 35/04*        (2006.01)
(Continued)

(52) U.S. Cl.
CPC .......... *B29C 64/295* (2017.08); *B29C 35/045* (2013.01); *B29C 64/218* (2017.08);
(Continued)

(58) Field of Classification Search
CPC ..... B29C 64/295; B29C 64/153; B22F 12/70; B22F 12/38
See application file for complete search history.

(56) References Cited

U.S. PATENT DOCUMENTS 4,034,219 A      7/1977   Louden et al.
4,404,566 A      9/1983   Clark et al.
(Continued)

FOREIGN PATENT DOCUMENTS

CN          201815393 U        5/2011
CN          103949636 A        7/2014
(Continued)

OTHER PUBLICATIONS

US 9,744,592 B1, 08/2017, Schmitt et al. (withdrawn)
(Continued)

*Primary Examiner* — Alison L Hindenlang
*Assistant Examiner* — Alexander A Wang
(74) *Attorney, Agent, or Firm* — Dinsmore & Shohl LLP

(57)                    ABSTRACT

A method for forming an object includes moving an assembly including an energy source, heating an initial layer of build material (31*i*, 31*s*, 31, 3, 50) positioned in a build area via forced convection around the energy source of the assembly, and spreading build material (31) on the build area, thereby depositing a second layer of build material (31*i*, 31*s*, 31, 3, 50) over the initial layer of build material (31 i, 31*s*, 31, 3, 50).

19 Claims, 16 Drawing Sheets

(51) Int. Cl.

| | |
|---|---|
| *B29C 64/218* | (2017.01) |
| *B29C 64/264* | (2017.01) |
| *B33Y 10/00* | (2015.01) |
| *B33Y 30/00* | (2015.01) |

(52) U.S. Cl.

CPC ...... *B29C 64/264* (2017.08); *B29C 2035/046* (2013.01); *B33Y 10/00* (2014.12); *B33Y 30/00* (2014.12)

(56) References Cited

U.S. PATENT DOCUMENTS

| | | | |
|---|---|---|---|
| 4,680,895 A | 7/1987 | Roestenberg | |
| 4,722,824 A | 2/1988 | Wiech, Jr. | |
| 5,012,260 A | 4/1991 | Yoshimura et al. | |
| 5,204,055 A | 4/1993 | Sachs et al. | |
| 5,387,380 A | 2/1995 | Cima et al. | |
| 6,007,318 A | 12/1999 | Russell et al. | |
| 6,092,887 A | 7/2000 | Tanino et al. | |
| 6,159,085 A | 12/2000 | Hara | |
| 6,375,874 B1 | 4/2002 | Russell et al. | |
| 6,454,811 B1 | 9/2002 | Sherwood et al. | |
| 6,607,572 B2 | 8/2003 | Gammack et al. | |
| 6,657,155 B2 | 12/2003 | Abe et al. | |
| 6,764,636 B1 | 7/2004 | Allanic et al. | |
| 6,824,714 B1 | 11/2004 | Turck et al. | |
| 6,835,222 B2 | 12/2004 | Gammack | |
| 6,945,638 B2 | 9/2005 | Teung et al. | |
| 6,989,115 B2 | 1/2006 | Russell et al. | |
| 7,034,246 B2 | 4/2006 | Muylaert et al. | |
| 7,037,382 B2 | 5/2006 | Davidson et al. | |
| 7,204,684 B2 | 4/2007 | Ederer et al. | |
| 7,225,803 B2 | 6/2007 | Boyadjieff | |
| 7,281,785 B2 | 10/2007 | Palifka et al. | |
| 7,291,002 B2 | 11/2007 | Russell et al. | |
| 7,296,990 B2 | 11/2007 | Devos et al. | |
| 7,357,629 B2 | 4/2008 | Weiskopf et al. | |
| 7,387,359 B2 | 6/2008 | Hernandez et al. | |
| 7,389,154 B2 | 6/2008 | Hunter et al. | |
| 7,435,368 B2 | 10/2008 | Davidson et al. | |
| 7,585,450 B2 | 9/2009 | Wahlstrom et al. | |
| 7,686,995 B2 | 3/2010 | Davidson et al. | |
| 7,690,909 B2 | 4/2010 | Wahlstrom | |
| 7,820,241 B2 | 10/2010 | Perret et al. | |
| 7,824,001 B2 | 11/2010 | Fienup et al. | |
| 7,850,271 B2 | 12/2010 | Gothait et al. | |
| 7,879,123 B2 | 2/2011 | Lundquist et al. | |
| 7,971,991 B2 | 7/2011 | Davidson et al. | |
| 7,979,152 B2 | 7/2011 | Davidson | |
| 8,017,055 B2 | 9/2011 | Davidson et al. | |
| 8,033,812 B2 | 10/2011 | Collins et al. | |
| 8,105,527 B2 | 1/2012 | Wahlstrom | |
| 8,167,395 B2 | 5/2012 | Fienup et al. | |
| 8,185,229 B2 | 5/2012 | Davidson | |
| 8,322,821 B2 | 12/2012 | Tsai et al. | |
| 8,951,033 B2 | 2/2015 | Hchsmann et al. | |
| 8,956,144 B2 | 2/2015 | Grasegger et al. | |
| 8,997,799 B2 | 4/2015 | Hodson et al. | |
| 9,027,378 B2 | 5/2015 | Crump et al. | |
| 9,346,127 B2 | 5/2016 | Buller et al. | |
| 9,403,235 B2 | 8/2016 | Buller et al. | |
| 9,446,448 B2 | 9/2016 | Mccoy et al. | |
| 9,586,290 B2 | 3/2017 | Buller et al. | |
| 9,636,870 B2 | 5/2017 | Kuzusako et al. | |
| 9,912,915 B2 | 3/2018 | Sinclair | |
| 9,919,474 B2 | 3/2018 | Napadensky | |
| 9,989,396 B2 | 6/2018 | Gold et al. | |
| 10,022,794 B1 | 7/2018 | Redding et al. | |
| 10,093,103 B2 | 10/2018 | Araki et al. | |
| 10,166,603 B2 | 1/2019 | Kawada et al. | |
| 10,183,330 B2 | 1/2019 | Buller et al. | |
| 10,189,267 B2 | 1/2019 | Sakai et al. | |
| 10,195,693 B2 | 2/2019 | Buller et al. | |
| 10,232,443 B2 | 3/2019 | Myerberg et al. | |
| 10,259,044 B2 | 4/2019 | Buller et al. | |
| 10,272,492 B2 | 4/2019 | Gibson et al. | |
| 10,272,525 B1 | 4/2019 | Buller et al. | |
| 10,286,452 B2 | 5/2019 | Buller et al. | |
| 10,286,571 B2 | 5/2019 | Hchsmann et al. | |
| 10,336,053 B2 | 7/2019 | Sasaki | |
| 10,343,725 B2 | 7/2019 | Martin et al. | |
| 10,350,682 B2 | 7/2019 | Myerberg et al. | |
| 10,406,262 B2 | 9/2019 | Bonassar et al. | |
| 10,414,089 B2 | 9/2019 | Maier | |
| 10,449,696 B2 | 10/2019 | Elgar et al. | |
| 10,486,361 B2 | 11/2019 | Kawabata | |
| 10,486,363 B2 | 11/2019 | Sachs et al. | |
| 10,569,331 B2 | 2/2020 | Kawada et al. | |
| 10,632,675 B2 | 4/2020 | Chanclon et al. | |
| 10,695,981 B2 | 6/2020 | Hchsmann et al. | |
| 11,167,454 B2 | 11/2021 | Rockstroh et al. | |
| 2002/0043055 A1 | 4/2002 | Conrad | |
| 2002/0079601 A1 | 6/2002 | Russell et al. | |
| 2002/0116907 A1 | 8/2002 | Gammack et al. | |
| 2004/0194250 A1 | 10/2004 | Conrad et al. | |
| 2006/0219163 A1 | 10/2006 | Merot et al. | |
| 2006/0221127 A1 | 10/2006 | Lee et al. | |
| 2007/0077323 A1 | 4/2007 | Stonesmith et al. | |
| 2008/0111271 A1 | 5/2008 | Khoshnevis | |
| 2008/0117240 A1 | 5/2008 | Sheinman | |
| 2008/0200104 A1 | 8/2008 | Chuang | |
| 2008/0284819 A1 | 11/2008 | Owaki et al. | |
| 2008/0303882 A1 | 12/2008 | Silverbrook et al. | |
| 2008/0303883 A1 | 12/2008 | Miyazawa | |
| 2010/0043698 A1 | 2/2010 | Bolt | |
| 2012/0018032 A1 | 1/2012 | Von Essen | |
| 2013/0004607 A1 | 1/2013 | Hoechsmann et al. | |
| 2014/0240396 A1 | 8/2014 | Rosati et al. | |
| 2014/0314613 A1* | 10/2014 | Hopkinson | B33Y 30/00 264/460 |
| 2015/0110911 A1 | 4/2015 | Snyder | |
| 2015/0298394 A1 | 10/2015 | Sheinman | |
| 2015/0343533 A1 | 12/2015 | Park et al. | |
| 2016/0052054 A1 | 2/2016 | Orange et al. | |
| 2016/0096360 A1 | 4/2016 | Zetzl et al. | |
| 2016/0114533 A1 | 4/2016 | Grasegger et al. | |
| 2016/0151973 A1 | 6/2016 | Juan Jover et al. | |
| 2016/0339640 A1 | 11/2016 | Juan et al. | |
| 2016/0361874 A1 | 12/2016 | Park et al. | |
| 2016/0368054 A1 | 12/2016 | Ng et al. | |
| 2017/0050378 A1 | 2/2017 | Ederer et al. | |
| 2017/0106443 A1 | 4/2017 | Karlsson | |
| 2017/0106595 A1 | 4/2017 | Gnther et al. | |
| 2017/0120521 A1 | 5/2017 | Sakura et al. | |
| 2017/0144374 A1 | 5/2017 | Ono | |
| 2017/0182717 A1 | 6/2017 | Byun et al. | |
| 2017/0203514 A1 | 7/2017 | McCoy et al. | |
| 2017/0217104 A1 | 8/2017 | Cortes I Herms et al. | |
| 2017/0239725 A1 | 8/2017 | Ufton | |
| 2017/0246808 A1 | 8/2017 | Hchsmann et al. | |
| 2017/0252975 A1 | 9/2017 | Park | |
| 2017/0266880 A1 | 9/2017 | Matsubara | |
| 2017/0334138 A1 | 11/2017 | Vilajosana et al. | |
| 2017/0334144 A1 | 11/2017 | Fish et al. | |
| 2018/0001567 A1 | 1/2018 | Juan et al. | |
| 2018/0009110 A1 | 1/2018 | Langford et al. | |
| 2018/0056582 A1 | 3/2018 | Matusik et al. | |
| 2018/0111194 A1 | 4/2018 | Buller et al. | |
| 2018/0111196 A1 | 4/2018 | Brezoczky et al. | |
| 2018/0236504 A1 | 8/2018 | Pourcher et al. | |
| 2018/0297283 A1 | 10/2018 | Hagedorn et al. | |
| 2018/0304364 A1 | 10/2018 | Myerberg et al. | |
| 2018/0339467 A1 | 11/2018 | Donovan et al. | |
| 2018/0345541 A1 | 12/2018 | Cuyt et al. | |
| 2019/0001413 A1 | 1/2019 | Golz et al. | |
| 2019/0001559 A1* | 1/2019 | Zamorano | B29C 64/20 |
| 2019/0070779 A1 | 3/2019 | Chen et al. | |
| 2019/0084231 A1 | 3/2019 | Chanclon Fernandez et al. | |
| 2019/0118421 A1* | 4/2019 | Cano | B29C 35/16 |
| 2019/0134705 A1 | 5/2019 | Sheinman et al. | |
| 2019/0152148 A1 | 5/2019 | Kremer | |
| 2019/0160733 A1 | 5/2019 | Mirkin et al. | |
| 2019/0201982 A1 | 7/2019 | Lombardo et al. | |
| 2019/0210277 A1 | 7/2019 | Sachs et al. | |

(56) References Cited

U.S. PATENT DOCUMENTS

| | | | |
|---|---|---|---|
| 2019/0210282 A1 | 7/2019 | Sugiura et al. |
| 2019/0217385 A1 | 7/2019 | Bonilla Gonzalez et al. |
| 2019/0218501 A1 | 7/2019 | Kamen et al. |
| 2019/0240732 A1 | 8/2019 | Koch et al. |
| 2019/0358901 A1 | 11/2019 | Dugan |
| 2019/0366626 A1 | 12/2019 | Swartz et al. |
| 2020/0147885 A1 | 5/2020 | Gimenez Manent et al. |
| 2020/0282461 A1 | 9/2020 | Fang |
| 2020/0298474 A1 | 9/2020 | Gimenez et al. |
| 2020/0324467 A1 | 10/2020 | Tjellesen et al. |

FOREIGN PATENT DOCUMENTS

| | | |
|---|---|---|
| CN | 103862045 B | 1/2017 |
| CN | 106738907 A | 5/2017 |
| CN | 206528076 U | 9/2017 |
| CN | 109366982 A | 2/2019 |
| CN | 208745355 U | 4/2019 |
| CN | 109732916 A | 5/2019 |
| CN | 110076991 A | 8/2019 |
| CN | 209851598 U | 12/2019 |
| CN | 210211384 U | 3/2020 |
| CN | 210880916 U | 6/2020 |
| DE | 19743804 A1 | 4/1999 |
| DE | 19846478 A1 | 4/2000 |
| DE | 102009036153 A1 | 2/2011 |
| DE | 202013009787 U1 | 12/2013 |
| EP | 1704989 A2 | 9/2006 |
| EP | 1847370 A2 | 10/2007 |
| EP | 1776910 B1 | 4/2013 |
| EP | 2782743 A1 | 10/2014 |
| EP | 2091718 B1 | 8/2016 |
| EP | 2986405 B1 | 2/2017 |
| EP | 3456518 A1 | 3/2019 |
| EP | 3461574 A1 | 4/2019 |
| EP | 3475057 A1 | 5/2019 |
| EP | 3492244 A1 | 6/2019 |
| EP | 3511094 A1 | 7/2019 |
| EP | 3560714 A1 | 10/2019 |
| EP | 3566869 A2 | 11/2019 |
| EP | 3463817 B1 | 4/2021 |
| EP | 3575064 B1 | 8/2021 |
| GB | 2550339 A | 11/2017 |
| JP | 2002292751 A | 10/2002 |
| JP | 2006511365 A | 4/2006 |
| JP | 2009136758 A | 6/2009 |
| JP | 2010149318 A | 7/2010 |
| JP | 2013193222 A | 9/2013 |
| JP | 2015522438 A | 8/2015 |
| JP | 2018001414 A | 1/2018 |
| JP | 2018047562 A | 3/2018 |
| JP | 2018144037 A | 9/2018 |
| JP | 2020093259 A | 6/2020 |
| WO | 2010055751 A1 | 5/2010 |
| WO | 2011005690 A1 | 1/2011 |
| WO | 2013182913 A2 | 12/2013 |
| WO | 2014006877 A1 | 1/2014 |
| WO | 2014044676 A1 | 3/2014 |
| WO | 2014096177 A1 | 6/2014 |
| WO | 2015112885 A1 | 7/2015 |
| WO | 2015141779 A1 | 9/2015 |
| WO | 2016040453 A1 | 3/2016 |
| WO | 2016055523 A1 | 4/2016 |
| WO | 2016083234 A1 | 6/2016 |
| WO | 2017017272 A1 | 2/2017 |
| WO | 2017088897 A1 | 6/2017 |
| WO | 2017152142 A1 | 9/2017 |
| WO | 2017180314 A1 | 10/2017 |
| WO | 2018017117 A1 | 1/2018 |
| WO | 2018149544 A1 | 8/2018 |
| WO | 2018181334 A1 | 10/2018 |
| WO | 2018183396 A1 | 10/2018 |
| WO | 2018191667 A1 | 10/2018 |
| WO | 2018194446 A1 | 10/2018 |
| WO | 2018194685 A1 | 10/2018 |
| WO | 2018197888 A1 | 11/2018 |
| WO | 2019063741 A1 | 4/2019 |
| WO | 2019076705 A1 | 4/2019 |
| WO | 2019089497 A1 | 5/2019 |
| WO | 2019094269 A1 | 5/2019 |
| WO | 2019094283 A1 | 5/2019 |
| WO | 2019094367 A1 | 5/2019 |
| WO | 2019113412 A1 | 6/2019 |
| WO | 2019136222 A1 | 7/2019 |
| WO | 2019139742 A1 | 7/2019 |
| WO | 2019140000 A1 | 7/2019 |
| WO | 2019157074 A2 | 8/2019 |
| WO | 2019182618 A1 | 9/2019 |
| WO | 2019194826 A1 | 10/2019 |
| WO | 2019209881 A1 | 10/2019 |
| WO | 2019236074 A1 | 12/2019 |
| WO | 2020007891 A1 | 1/2020 |
| WO | 2020013828 A1 | 1/2020 |
| WO | 2020068101 A1 | 4/2020 |
| WO | 2020115468 A1 | 6/2020 |
| WO | 2020146416 A2 | 7/2020 |
| WO | 2020159507 A1 | 8/2020 |
| WO | 2020237118 A1 | 11/2020 |
| WO | 2020237119 A1 | 11/2020 |
| WO | 2020237120 A1 | 11/2020 |
| WO | 2020237122 A1 | 11/2020 |
| WO | 2020237123 A1 | 11/2020 |
| WO | 2020237138 A1 | 11/2020 |
| WO | 2020237142 A1 | 11/2020 |
| WO | 2020237143 A1 | 11/2020 |
| WO | 2020237144 A1 | 11/2020 |
| WO | 2020237161 A1 | 11/2020 |
| WO | 2020237163 A1 | 11/2020 |
| WO | 2020237165 A1 | 11/2020 |
| WO | 2020237166 A1 | 11/2020 |

OTHER PUBLICATIONS

International Search Report for Appln. No. PCT/US2021/055457 mailed Jan. 27, 2022, 20 pages.
International Search Report for Appln. No. PCT/US2021/055458 mailed Jan. 27, 2022, 15 pages.
International Search Report for Appln. No. PCT/US2021/055716 mailed Mar. 22, 2022, 21 pages.
International Search Report for Appln. No. PCT/US2021/055717 mailed Dec. 20, 2021, 16 pages.
International Search Report for Appln. No. PCT/US2021/055719 mailed Jan. 18, 2022, 17 pages.
International Search Report for Appln. No. PCT/US2021/055722 mailed Jan. 3, 2022, 14 pages.
International Search Report for Appln. No. PCT/US2021/056828 mailed Feb. 23, 2022, 11 pages.
International Search Report for Appln. No. PCT/US2021/056451 mailed Apr. 4, 2022, 33 pages.
International Search Report for Appln. No. PCT/US2021/056827 mailed Feb. 11, 2022, 15 pages.
International Search Report for Appln. No. PCT/US2021/056789 mailed Jan. 18, 2022, 18 pages.
International Search Report for Appln. No. PCT/US2021/056787 mailed Aug. 2, 2022, 12 pages.
International Search Report for Appln. No. PCT/US2021/057517 mailed Sep. 6, 2022, 21 pages.
International Preliminary Report for Appln. No. PCT/US2021/055457 mailed May 4, 2023, 14 pages.
International Preliminary Report for Appln. No. PCT/US2021/055458 mailed May 4, 2023, 10 pages.
International Preliminary Report for Appln. No. PCT/US2021/055716 mailed May 4, 2023, 16 pages.
International Preliminary Report for Appln. No. PCT/US2021/055717 mailed May 4, 2023, 11 pages.
International Preliminary Report for Appln. No. PCT/US2021/055719 mailed May 4, 2023, 12 pages.
International Preliminary Report for Appln. No. PCT/US2021/055722 mailed May 4, 2023, 10 pages.

(56) References Cited

OTHER PUBLICATIONS

International Preliminary Report for Appln. No. PCT/US2021/056828 mailed May 11, 2023, 8 pages.
International Preliminary Report for Appln. No. PCT/US2021/056451 mailed May 11, 2023, 23 pages.
International Preliminary Report for Appln. No. PCT/US2021/056827 mailed May 11, 2023, 9 pages.
International Preliminary Report for Appln. No. PCT/US2021/056789 mailed May 11, 2023, 11 pages.
International Preliminary Report for Appln. No. PCT/US2021/056787 mailed May 11, 2023, 8 pages.
International Preliminary Report for Appln. No. PCT/US2021/057517 mailed May 11, 2023, 15 pages.
Shanjani "Material Spreading and Compaction in Powder-Based Solid Freeform Fabrication Methods: Mathematical Modeling" Department of Mechanical and Mechatronic Engineering, University of Waterloo, Sep. 10, 2008.
Japanese Office Action for Application No. 2023-521818 dated Feb. 16, 2020 (5 pages with English Translation).
Japanese Office Action for Application No. 2023-521819 dated Feb. 20, 2024 (5 pages with English Translation).
European Patent Office Action for Application No. 21807388.0 dated Mar. 22, 2023 (8 pages).

* cited by examiner

1

PRINT AND RECOAT ASSEMBLIES FOR ADDITIVE MANUFACTURING SYSTEMS AND METHODS FOR USING THE SAME

CROSS-REFERENCE TO RELATED APPLICATION APPLICATIONS

This application is a National Stage Entry under 35 U.S.C. § 371 of International Patent Application No. PCT/US2021/055458, filed Oct. 18, 2021, which claims the benefit of U.S. Provisional Patent Application No. 63/093,933, filed Oct. 20, 2020, for "Print and Recoat Assemblies for Additive Manufacturing Systems and Methods for Using the Same," which is hereby incorporated by reference in its entirety including the drawings.

BACKGROUND

Field

The present specification generally relates to additive manufacturing systems and, more specifically, to print and recoat assemblies for additive manufacturing systems and methods for using the same.

Technical Background

Additive manufacturing systems may be utilized to "build" an object from build material, such as organic or inorganic powders in a layer-wise manner. Conventional additive manufacturing systems include various "recoat" apparatuses that are configured to sequentially distribute layers of build material. Conventional additive manufacturing systems may further include various "print" apparatuses that are configured to deposit binder on the build material and that can be cured to the build material to "build" an object. In some configurations, build material may be fused to "build" the object via the application of energy by a laser or the like.

SUMMARY

In some configurations, the application of new layers of build material can apply stresses on the underlying layer of cured build material, which can lead to tearing or damage of the cured build material. Further, voids can be formed in the new layer of build material, which can subsequently lead to defects in the finished object.

To reduce stresses applied to the underlying layer of cured build material and reduce voids, excess build material can initially be applied to the new layer. The excess build material can then be removed, thereby reducing the new layer of build material to a desired thickness. In some conventional configurations, the excess build material may be deposited into a drain or the like for reclamation or disposal.

However, reclamation may be time consuming and costly, and disposal of the excess build material may generally increase manufacturing costs. Embodiments of the present disclosure are directed to recoat assemblies that return excess build material to a build supply, such that the excess build material can be utilized to apply a subsequent layer of new build material. By re-using the excess build material, overall build material usage may be reduced, thereby reducing manufacturing costs.

In some configurations, the build material and/or the binder may be heated by an energy source to warm the build material and/or cure the binder. The energy sources can be attached to the recoat assembly and/or the print assembly, and the energy sources may heat the build material and/or the binder as the print assembly and/or the recoat assembly pass over the build material and/or binder. Because the energy sources move over the build material and/or binder along with the recoat assembly and/or the print assembly, the energy sources may be positioned over a particular portion of the build material and/or binder for a short period of time. Short residence time of the energy sources over particular portions of the build material and/or binder may lead to insufficient energy being applied to the build material and/or the binder. The energy sources can be positioned over particular portions of the build material and/or binder for longer times by slowing the movement of the recoat assembly and/or the print assembly. However, slowing movement of the recoat assembly and/or the print assembly may increase the time to build an object, thereby decreasing productivity and increasing manufacturing costs. In some configurations, the amount of thermal energy emitted by the energy sources can be increased, thereby increasing the amount of energy applied to the build material and/or the binder. However, increased thermal energy can cause build material and/or binder to burn or overheat, which can lead to defects in the object being produced. Accordingly, a need exists for improved systems and methods for applying thermal energy to build material and/or binder in an additive manufacturing system.

In one embodiment, a method for forming an object includes moving an assembly including an energy source, heating an initial layer of build material positioned in a build area via forced convection around the energy source of the assembly, and spreading build material on the build area, thereby depositing a second layer of build material over the initial layer of build material.

In another embodiment, a method for forming an object includes moving a recoat assembly in a coating direction over a supply receptacle including build material, where the recoat assembly includes a powder spreading member, contacting the build material in the supply receptacle with the powder spreading member, irradiating, with an energy source coupled to the recoat assembly, an initial layer of build material positioned in a build receptacle, and passing a gas over the energy source, thereby heating the initial layer of build material positioned in the build receptacle via forced convection.

In yet another embodiment, an additive manufacturing system includes at least one of a print assembly and a recoat assembly, a housing assembly coupled to the at least one of the print assembly and the recoat assembly, the housing assembly including an energy source enclosure, an energy source positioned at least partially within the energy source enclosure, and an air distribution system in communication with the energy source enclosure, where the air distribution system includes a pump structurally configured to pass a gas to the energy source enclosure to transfer thermal energy from the energy source.

Additional features and advantages of the additive manufacturing apparatuses described herein, and the components thereof, will be set forth in the detailed description which follows, and in part will be readily apparent to those skilled in the art from that description or recognized by practicing the embodiments described herein, including the detailed description which follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
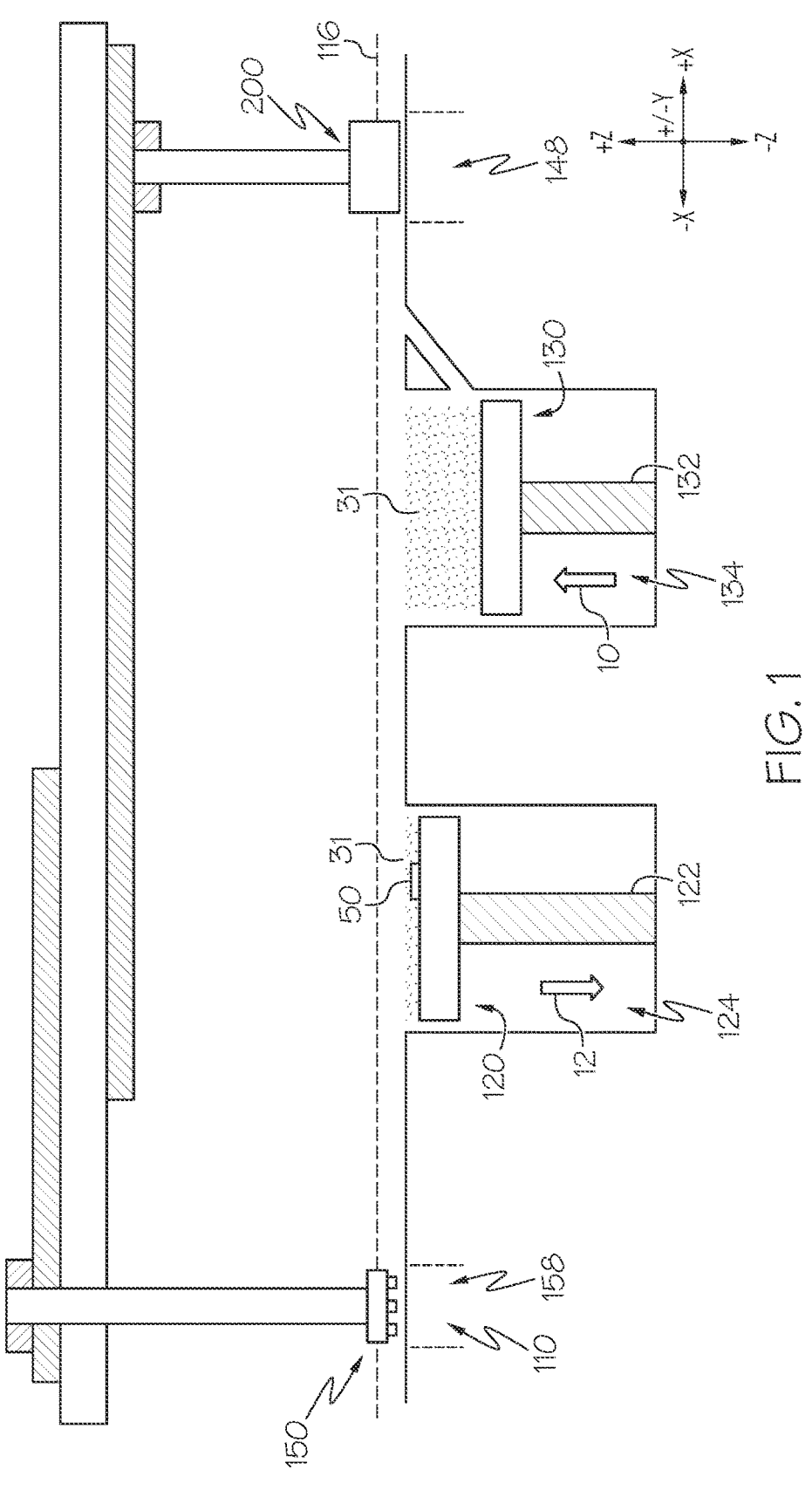
FIG. 1 schematically depicts an additive manufacturing system, according to one or more embodiments shown and described herein.

Reference will now be made in detail to embodiments of additive manufacturing apparatuses, and components thereof, examples of which are illustrated in the accompanying drawings. Whenever possible, the same reference numerals will be used throughout the drawings to refer to the same or like parts. Additive manufacturing systems according to the present disclosure generally include a recoat assembly for spreading build material in a build area. The recoat assembly may move build material from a build supply to the build area in sequential layers. In embodiments, the recoat assembly may move the excess build material back to the build supply such that the excess build material may be utilized in subsequent layers. In some embodiments, the recoat assembly or a print assembly may include one or more energy sources that can apply energy to the build material. In embodiments described herein, an air distribution system may distribute heat generated by the one or more energy sources by forced convection. These and other embodiments of recoat assemblies and print assemblies for additive manufacturing systems, additive manufacturing systems comprising the recoat and print assemblies, and methods for using the same are described in further detail herein with specific reference to the appended drawings.

Ranges can be expressed herein as from "about" one particular value, and/or to "about" another particular value. When such a range is expressed, another embodiment includes from the one particular value and/or to the other particular value. Similarly, when values are expressed as approximations, by use of the antecedent "about," it will be understood that the particular value forms another embodiment. It will be further understood that the endpoints of each of the ranges are significant both in relation to the other endpoint, and independently of the other endpoint.

Directional terms as used herein—for example up, down, right, left, front, back, top, bottom—are made only with reference to the figures as drawn and are not intended to imply absolute orientation unless otherwise expressly stated.

The phrase "communicatively coupled" is used herein to describe the interconnectivity of various components and means that the components are connected either through wires, optical fibers, or wirelessly such that electrical, optical, and/or electromagnetic signals may be exchanged between the components.

Unless otherwise expressly stated, it is in no way intended that any method set forth herein be construed as requiring that its steps be performed in a specific order, nor that with any apparatus specific orientations be required. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

As used herein, the singular forms "a," "an" and "the" include plural referents unless the context clearly dictates otherwise. Thus, for example, reference to "a" component includes aspects having two or more such components, unless the context clearly indicates otherwise.

Referring now to FIG. 1, an additive manufacturing system 100 is schematically depicted. The additive manufacturing system 100 includes a supply platform 130, a build platform 120, a print assembly 150, a cleaning station 110, and a recoat assembly 200. The supply platform 130 is coupled to a supply platform actuator 132. The supply platform actuator 132 is movable in the vertical direction (i.e., the +/−Z direction of the coordinate axes depicted in the figure) such that the supply platform 130 may be raised or lowered within a supply receptacle 134. The build platform 120 is located adjacent to the supply platform 130 and, like the supply platform 130, is coupled to a build platform actuator 122. The build platform actuator 122 is movable in the vertical direction such that the build platform 120 may be raised or lowered (i.e., the +/−Z direction of the coordinate axes depicted in the figure) within a build receptacle 124.

In operation, build material 31, such as organic or inorganic powder, is positioned on the supply platform 130. The supply platform 130 is actuated to present a layer of the build material 31 in the path of the recoat assembly 200. The recoat assembly 200 is then actuated along a working axis 116 of the additive manufacturing system 100 towards the build platform 120. As the recoat assembly 200 traverses the working axis 116 over the supply platform 130 towards the build platform 120, the recoat assembly 200 distributes the layer of build material 31 in the path of the recoat assembly 200 from the supply platform 130 to the build platform 120.

Thereafter, the print assembly 150 moves along the working axis 116 over the build platform 120 and may deposit a layer of binder 50 in a predetermined pattern on the layer of build material 31 that has been distributed on the build platform 120. After the binder 50 is deposited, an energy source may be utilized to cure the deposited binder 50, as described in greater detail herein. The print assembly 150 can then move to a home position 158 where at least a portion of the print assembly 150 is positioned over the cleaning station 110. While the print assembly 150 is in the home position 158, the print assembly 150 works in conjunction with the cleaning station 110 to provide cleaning and maintenance operations on the elements of the print assembly 150 to ensure the elements are not fouled or otherwise clogged. This may assist in ensuring that the print assembly 150 is capable of depositing the binder 50 in the desired pattern during a subsequent deposition pass.

During this maintenance interval, the supply platform 130 is actuated in an upward vertical direction (i.e., in the +Z direction of the coordinate axes depicted in the figure) as indicated by arrow 10 to present a new layer of build material 31 in the path of the recoat assembly 200. The build platform 120 is actuated in the downward vertical direction (i.e., in the −Z direction of the coordinate axes depicted in the figure) as indicated by arrow 12 to prepare the build platform 120 to receive a new layer of build material 31 from the supply platform 130. The recoat assembly 200 is then actuated along the working axis 116 of the additive manufacturing system 100 again to add another layer of build material 31 and binder 50 to the build platform 120. This sequence of steps is repeated multiple times to build an object on the build platform 120 in a layer-wise manner.

While the embodiment depicted in FIG. 1 and described above describes the recoat assembly 200 and the print assembly 150 as being different components, it should be understood that recoat assembly 200 and the print assembly 150 may be included in a common assembly that is movable along the working axis 116. Further, while reference is made herein to additive manufacturing systems including a print assembly 150 that dispenses a binder 50, it should be understood that this is merely an example. For example, in some embodiments, instead of building objects with a curable binder 50 applied to the build material 31, in some embodiments, a laser or other energy source may be applied to the build material 31 to fuse the build material 31.

Figure 2:
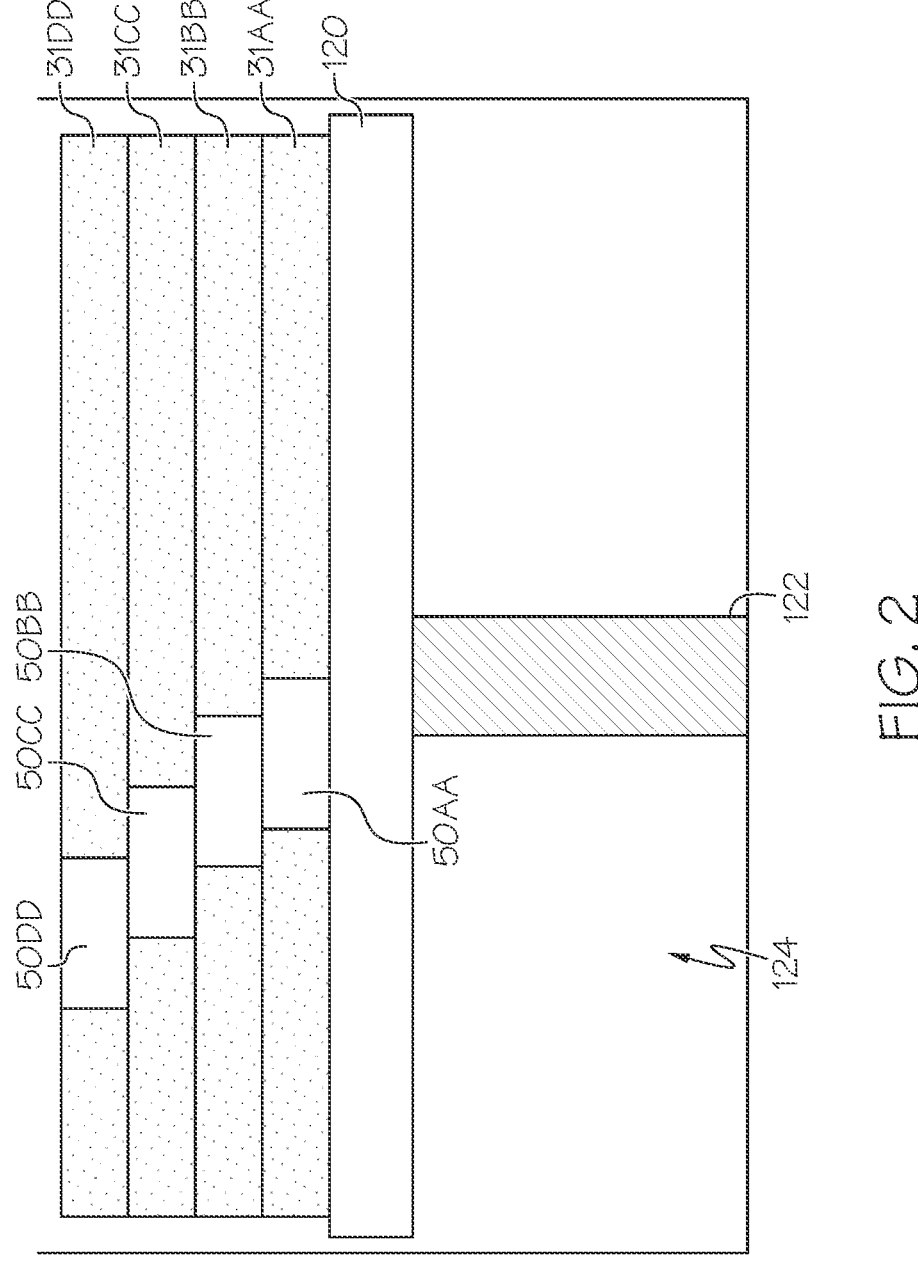
FIG. 2 schematically depicts an enlarged view of build material within the additive manufacturing system of FIG. 1, according to one or more embodiments shown and described herein.

Referring to FIG. 2, to form an object, layers of build material 31AA-31DD may be sequentially positioned on top of one another. In the example provided in FIG. 2, sequential layers of binder 500AA-500CC are positioned on the layers of build material 31AA-31DD. By curing the layers of binder 50AA-50CC, a finished product may be formed.

Figure 3:
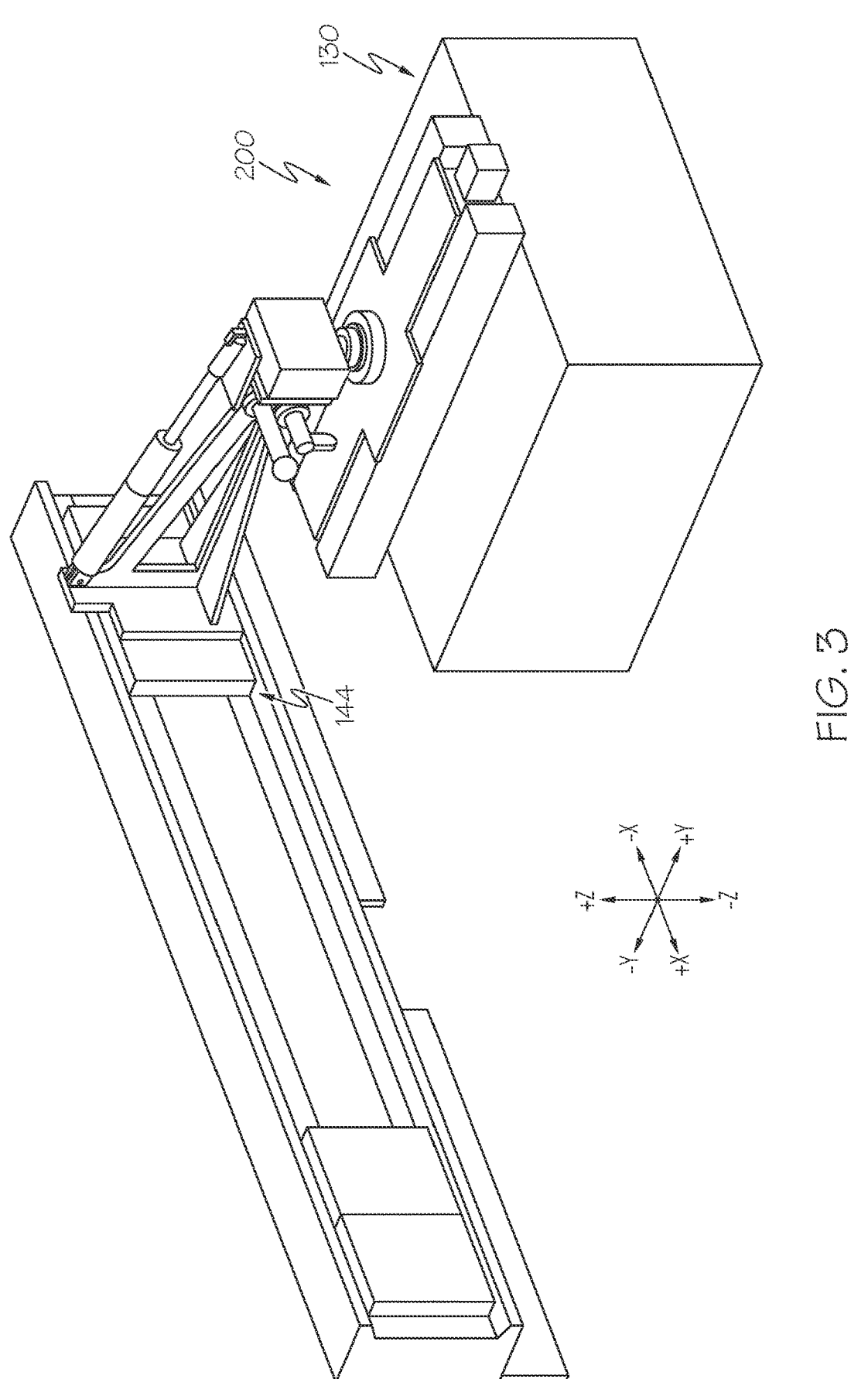
FIG. 3 schematically depicts a perspective view of an embodiment of a recoat assembly of the additive manufacturing system of FIG. 1, according to one or more embodiments shown and described herein.

Referring to FIG. 3, a perspective view of one embodiment of the recoat assembly 200 is schematically depicted. The recoat assembly 200, in embodiments, may include a recoat assembly transverse actuator 144 that moves the recoat assembly 200 in the lateral direction (i.e., in the +/−X-direction as depicted in the figure). In some embodiments, the recoat assembly 200 may further include additional actuators that move the recoat assembly in the vertical direction (i.e., in the +/−Z-direction as depicted in the figure), in a longitudinal direction (i.e., in the +/−Y-direction as depicted in the figure), and/or that may rotate the recoat assembly about any or all of the lateral direction, the vertical direction, and the longitudinal direction.

Figure 4:
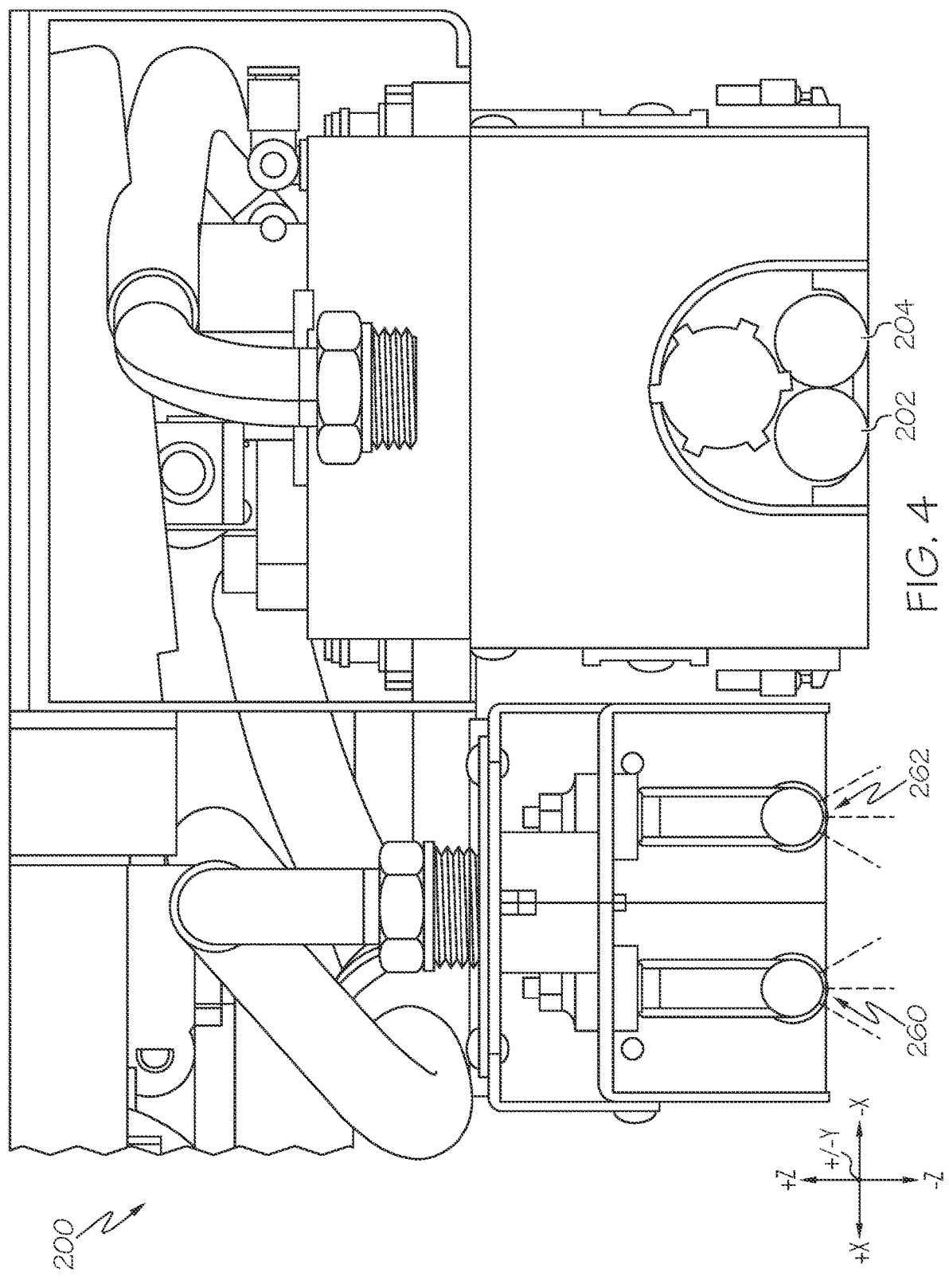
FIG. 4 schematically depicts a section view of the recoat assembly of FIG. 1 including a housing assembly that at least partially encapsulates one or more energy sources, according to one or more embodiments shown and described herein.

Referring to FIG. 4, a section view of the recoat assembly 200 is schematically depicted. In embodiments, the recoat assembly 200 includes one or more powder distributing members that distribute build material 31 (FIG. 1). For example, in the embodiment depicted in FIG. 4, the recoat assembly 200 includes one or more rollers, in particular, a first roller 202 and a second roller 204. While in the embodiment depicted in FIG. 4, the recoat assembly 200 includes the first roller 202 and the second roller 204, it should be understood that this is merely an example, and the recoat assembly 200 may include more rollers or may include a single roller. Further, while the powder spreading member depicted in FIG. 4 includes one or more rollers, it should be understood that the powder spreading member may include any suitable structure for spreading build material 31 (FIG. 1), for example and without limitation, a doctor blade or the like.

In some embodiments, the recoat assembly 200 generally includes one or more energy sources that are structurally configured to apply generally emit electromagnetic radiation, such as infrared radiation, ultraviolet radiation, or the like. In some embodiments, the recoat assembly 200 may include a first energy source 260 and/or a second energy source 262 that may emit energy that heats build material 31 (FIG. 1) and/or cures binder 50 (FIG. 1) on the build material 31, as described in greater detail herein.

In the embodiment depicted in FIG. 4, the first energy source 260 is an outer energy source and the second energy source 262 is an inner energy source positioned closer to the powder spreading members (e.g., the first roller 202 and the second roller 204) than the first energy source 260 (i.e., in the −X-direction as depicted in the figure). The first energy source 260 and the second energy source 262 generally emit energy toward build material 31 (FIG. 1) positioned beneath the first energy source 260 and the second energy source 262 (e.g., in the −Z-direction as depicted in the figure). By emitting energy toward the build material 31 (FIG. 1), the first energy source 260 and/or the second energy source 262 may heat the build material 31 (FIG. 1) before binder 50 (FIG. 1) is applied to the build material 31, and may be used to "pre-heat" the build material 31. In some embodiments, by emitting energy toward the build material 31 (FIG. 1), the first energy source 260 and/or the second energy source 262 may assist in curing the binder 50 (FIG. 1) to the build material 31 (FIG. 1). While in the embodiment depicted in FIG. 4, the recoat assembly 200 includes the first energy source 260 and the second energy source 262, it should be understood that this is merely an example and recoat assemblies according to the present application may include any suitable number of energy sources and may include a single energy source.

Figure 5:
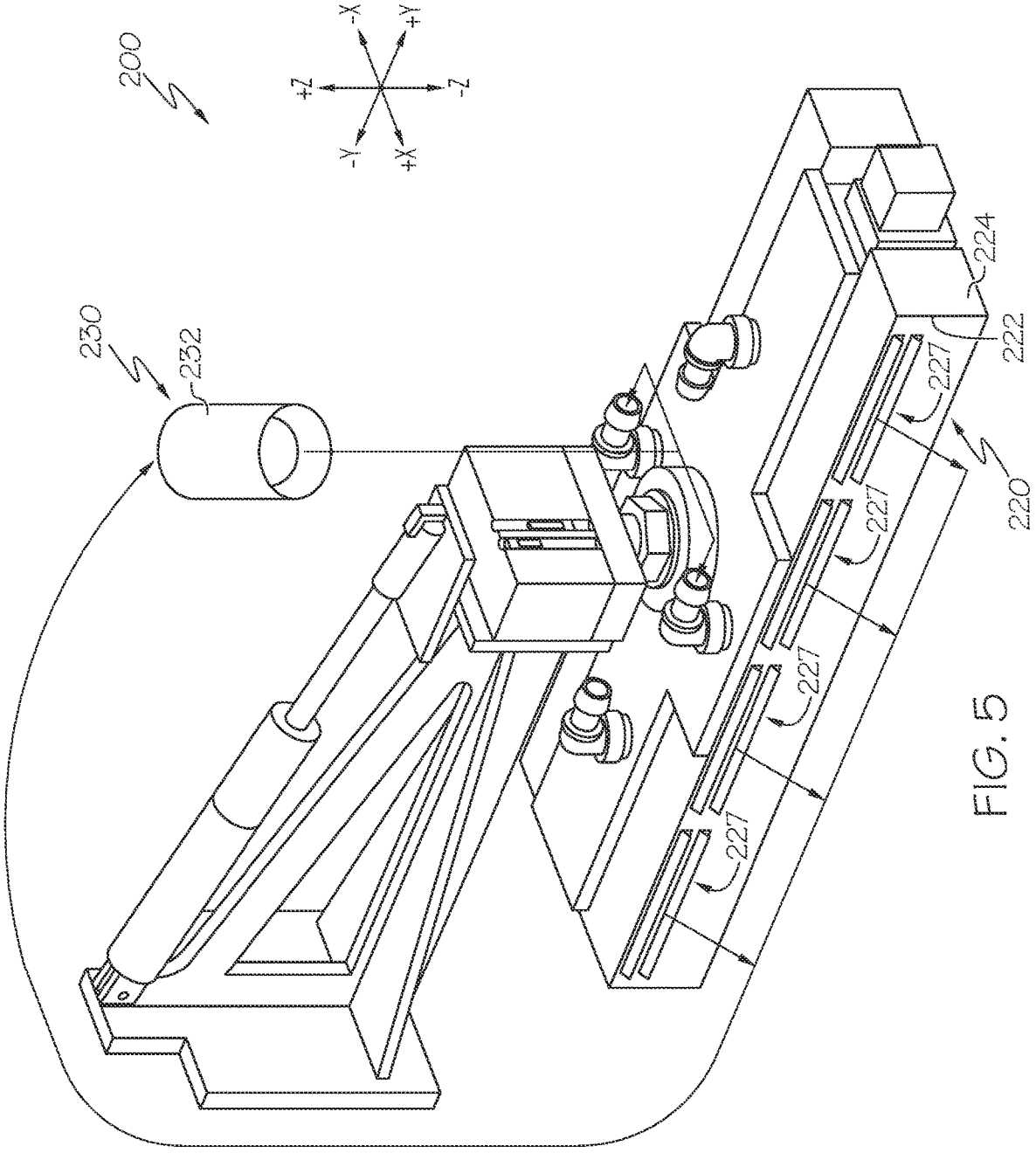
FIG. 5 schematically depicts a perspective view of the recoat assembly including an air distribution system in communication with the housing assembly of FIG. 4, according to one or more embodiments shown and described herein.
Figure 6A:
FIG. 6A schematically depicts an enlarged perspective view of the housing assembly with an upper housing removed, according to one or more embodiments shown and described herein.
Figure 6B:
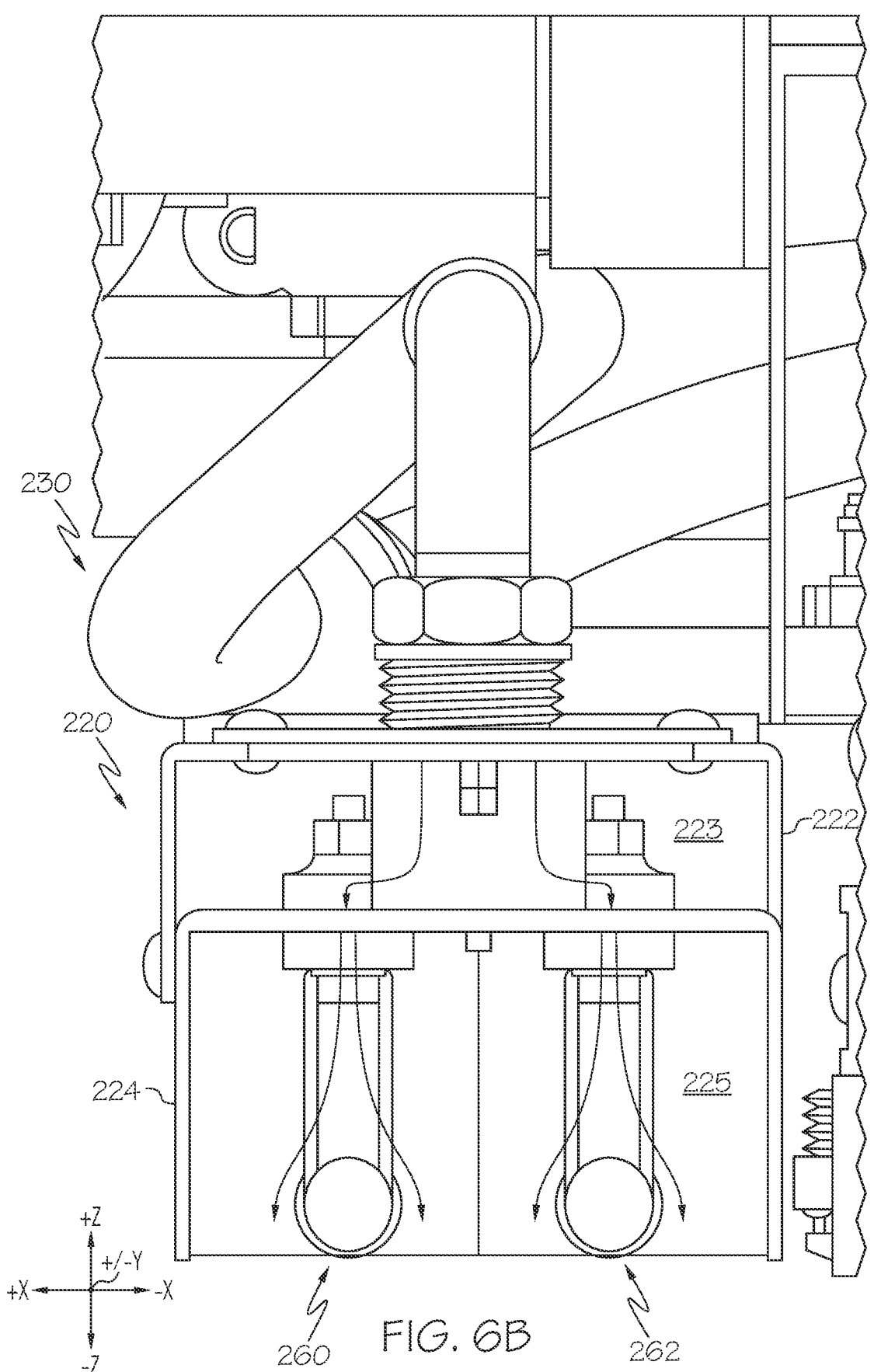
FIG. 6B schematically depicts an enlarged section view of the housing assembly at least partially encapsulating the one or more energy sources of FIG. 4, according to one or more embodiments shown and described herein.
Figure 6C:
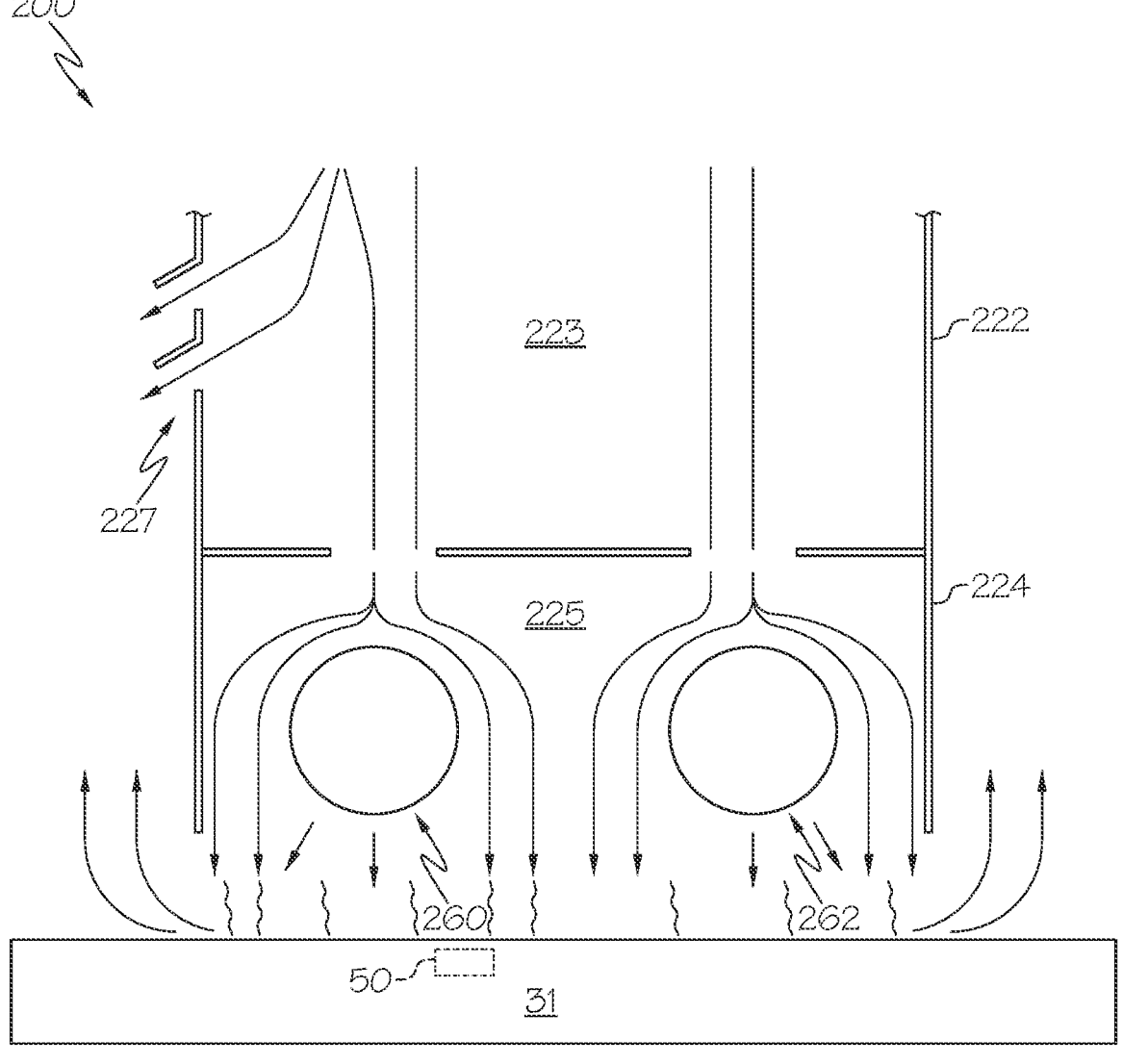
FIG. 6C schematically depicts an enlarged section view of the housing assembly of FIG. 4, according to one or more embodiments shown and described herein.
Figure 7:
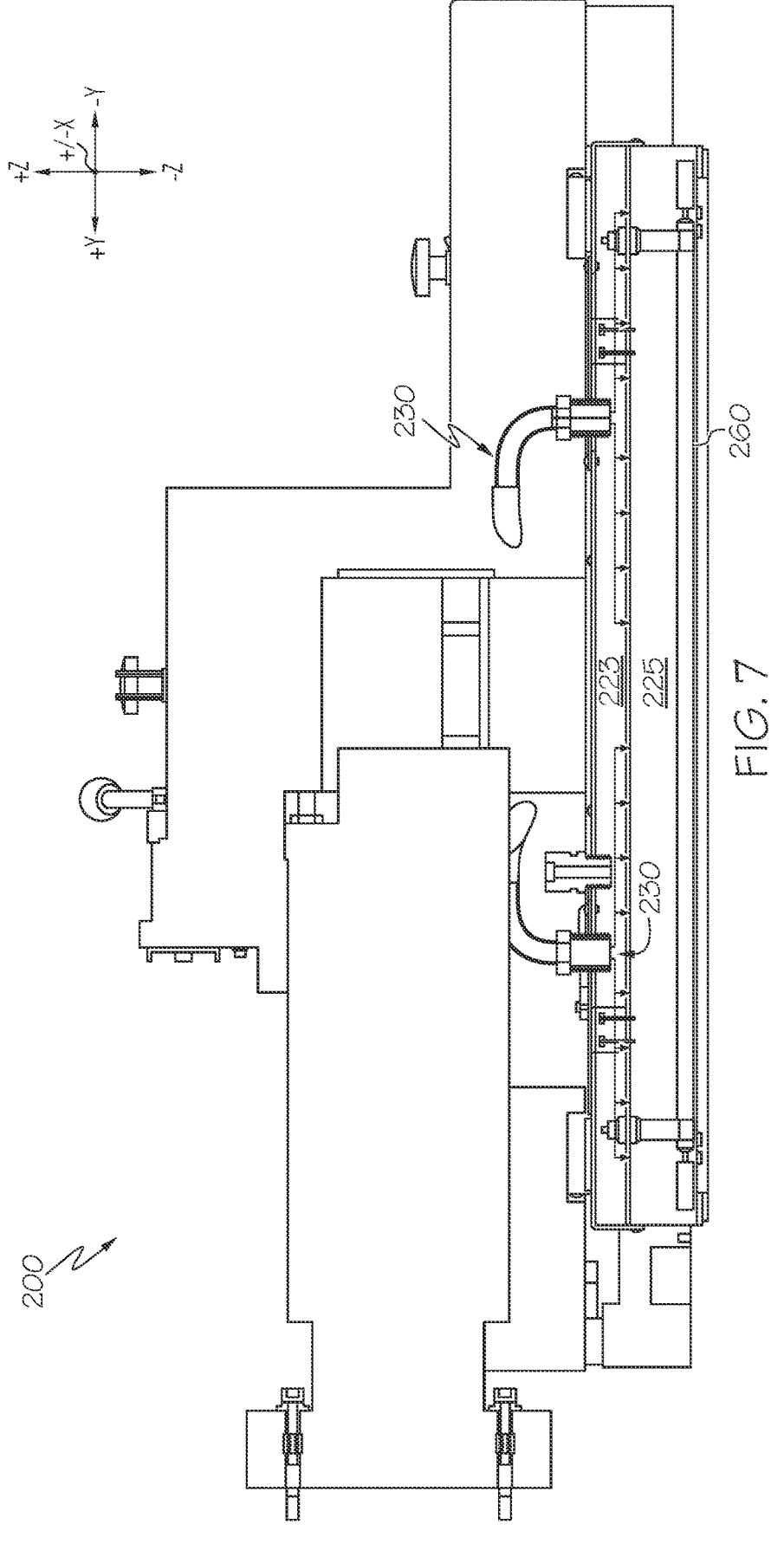
FIG. 7 schematically a front section view of the housing assembly and the one or more energy sources of FIG. 4, according to one or more embodiments shown and described herein.

Referring to FIGS. 5-7, in embodiments, the first energy source 260 and the second energy source 262 are positioned at least partially within a housing assembly 220. For example, and referring particularly to FIGS. 6B and 6C, in embodiments, the first energy source 260 and the second energy source 262 are embodied as radiation-emitting bulbs positioned at least partially within the housing assembly 220. In embodiments, the housing assembly 220 includes an upper housing 222 that at least partially defines a duct 223, and a lower housing 224 at least partially defines an energy source enclosure 225. In embodiments, the first energy source 260 and/or the second energy source 262 are positioned at least partially within the energy source enclosure 225. The duct 223 is in communication with an air distribution system 230 that is structurally configured to pass a gas, such as air, an inert gas or gases, or the like to the duct 223. In some embodiments, the housing assembly 220 may be coupled to the recoat assembly 200 through one or more thermally insulating materials (e.g., gaskets and/or the like) that restrict the flow of thermal energy from the housing assembly 220 to the recoat assembly 200.

For example and referring particularly to FIGS. 5, 6A, and 6B, the air distribution system 230 generally includes a pump 232 that moves gas to the duct 223. In embodiments, the pump 232 may be configured to move gas to the duct 223 at rate of at least about 85 liters per minute, however, it should be understood that the pump 232 may move gas to the duct 223 at any suitable rate. In some embodiments, the pump 232 may be in communication with a distribution hose 236 that is in communication with the duct 223. In some embodiments, the distribution hose 236 may include one or more "splits" such that the distribution hose 236 may pass gas from the pump 232 along the duct 223 (e.g., along the duct 223 in the +/−Y-direction as depicted in the figure). The duct 223 is in communication with the energy source enclosure 225, such that gas passed from pump 232 to the duct 223 can be passed from the duct 223 to the energy source enclosure 225. As gas is passed from the pump 232 to the duct 223, the gas may be distributed along a length of the duct 223 (e.g., along the duct 223 in the +/−Y-direction as depicted in the figure) before being passed to the energy source enclosure 225. Gas can flow from the duct 223 to the energy source enclosure 225, for example through one or more apertures 229 positioned between the duct 223 and the energy source enclosure 225. As shown in FIG. 6A, the one or more apertures 229 may extend along a length of the duct 223, for example in the +/Y-direction as depicted in the figure. In some embodiments, the upper housing 222 and/or the lower housing may define one or more vents 227 through which gas may also pass.

As the gas passes through the one or more apertures 229, the gas can then flow around the first energy source 260 and/or the second energy source 262, as shown in FIGS. 6B and 6C. The gas may transfer thermal energy from the first energy source 260 and/or the second energy source 262 to the build material 31 and/or the binder 50 positioned below the first energy source 260 and/or the second energy source 262, for example through forced convection. In this way, the air distribution system 230, the duct 223, and the energy source enclosure 225 may assist in transferring and/or distributing thermal energy from the first energy source 260 and/or the second energy source 262 to the build material 31 and/or binder 50.

In particular, in embodiments, the build material 31 and/or the binder 50 may receive thermal energy via radiation emitted from the first energy source 260 and/or the second energy source 262. The gas passed over the first energy source 260 and/or the second energy source 262 may supplement the thermal energy applied to the build material 31 and/or the binder 50 via radiation. In some embodiments, the build material 31 and/or the binder 50 may be primarily heated via radiation from the first energy source 260 and/or the second energy source 262, while the gas passed over the first energy source 260 and/or the second energy source 262 supplements the energy transferred via radiation. In embodiments, the air distribution system 230 may increase the heat density applied to the build material 31 and/or the binder 50 by the first energy source 260 and/or the second energy source 262 and/or may increase the area of thermal energy applied by the first energy source 260 and/or the second energy source 262. In some embodiments, the air distribution system 230 may assist in maintaining a stable boundary layer close to the build material 31 and/or binder 50, for example, by more evenly distributing thermal energy applied by the first energy source 260 and/or the second energy source 262 as compared to systems that do not include an air distribution system 230. Furthermore, by passing gas over the first energy source 260 and/or the second energy source 262, heat that would otherwise dissipate and be lost may be utilized to heat the build material 31 and/or build material 50, thereby increasing the energy efficiency of the first energy source 260 and/or the second energy source 262.

By more efficiently transferring thermal energy from the first energy source 260 and/or the second energy source 262 to build material 31 and/or binder 50, the air distribution system 230 may assist in curing the binder 50 more quickly than additive manufacturing systems that do not include an air distribution system 230.

For example and referring to FIGS. 1, 6B, and 6C, in embodiments in which the first energy source 260 and the second energy source 262 are coupled to the recoat assembly 200, the first energy source 260 and the second energy source 262 move over the build material 31 and/or the binder 50 as the recoat assembly 200 moves along the working axis 116. Accordingly, the first energy source 260 and the second energy source 262 generally apply thermal energy to the build material 31 and/or the binder 50 while moving along the working axis 116. To minimize the amount of time to build an object, it may be desirable to move the recoat assembly 200 along the working axis 116 as fast as practicable to adequately move the build material 31 to the build receptacle 124. However, as the speed of the recoat assembly 200 along the working axis 116 increases, the time that the first energy source 260 and the second energy source 262 are positioned over any particular portion of build material 31 and/or binder 50 decreases. As the amount of time that the first energy source 260 and the second energy source 262 are positioned over any particular portion of build material 31 and/or binder 50 decreases, the amount of thermal energy transferred from the first energy source 260 and the second energy source 262 to the build material 31 and binder 50 decreases. Accordingly, while increasing the speed of the recoat assembly 200 along the working axis 116 may reduce the amount of time to build an object, the build material 31 and the binder 50 may not be adequately heated by the first energy source 260 and the second energy source 262.

However, because the air distribution system 230 assists in transferring thermal energy from the first energy source 260 and the second energy source 262, sufficient thermal energy may be applied to the build material 31 and the binder 50 while the recoat assembly 200 is moved along the working axis 116 at high speeds, as compared to conventional additive manufacturing systems that do not include the air distribution system 230.

Further, in some instances, the air distribution system 230 may allow the first energy source 260 and/or the second energy source 262 to be operated at a reduced power while still providing a similar amount of energy to the build material 31 and the binder 50 as configurations that do not include the air distribution system 230. By operating the first energy source 260 and/or the second energy source 262 at reduced power, a usable life of the first energy source 260 and/or the second energy source 262 may be increased as compared to conventional configurations.

Furthermore, in embodiments, the air distribution system 230 may dissipate heat transferred from the first energy source 260 and/or the second energy source 262 to the lower housing 224 and/or the upper housing 222, thereby cooling the lower housing 224 and/or the upper housing 222. In some embodiments, components (e.g., sensors and the like) of the recoat assembly 200 may be positioned proximate to and/or may be coupled to the lower housing 224 and/or the upper housing 222. By cooling the lower housing 224 and/or the upper housing 222, the air distribution system 230 may reduce the likelihood of overheating and damaging components (e.g., sensors and the like) of the recoat assembly 200 coupled to or positioned proximate to the lower housing 224 and/or the upper housing 222. In embodiments in which the upper housing 222 and/or the lower housing 224 define the vents 227, gas may additionally be passed through the vents 227, which may also assist in cooling components (e.g., sensors and the like) of the recoat assembly 200 coupled to or positioned proximate to the lower housing 224 and/or the upper housing 222.

While in the embodiment described above and depicted in FIGS. 5-7 the air distribution system 230 passes gas around the first energy source 260 and the second energy source 262 coupled to the recoat assembly 200, it should be understood that this is merely an example. In some embodiments, energy sources may additionally or alternatively be positioned within housing assemblies coupled to the print assembly 150, and the air distribution system 230 and/or another air distribution system may pass gas around the energy sources coupled to the print assembly 150.

Figure 8:
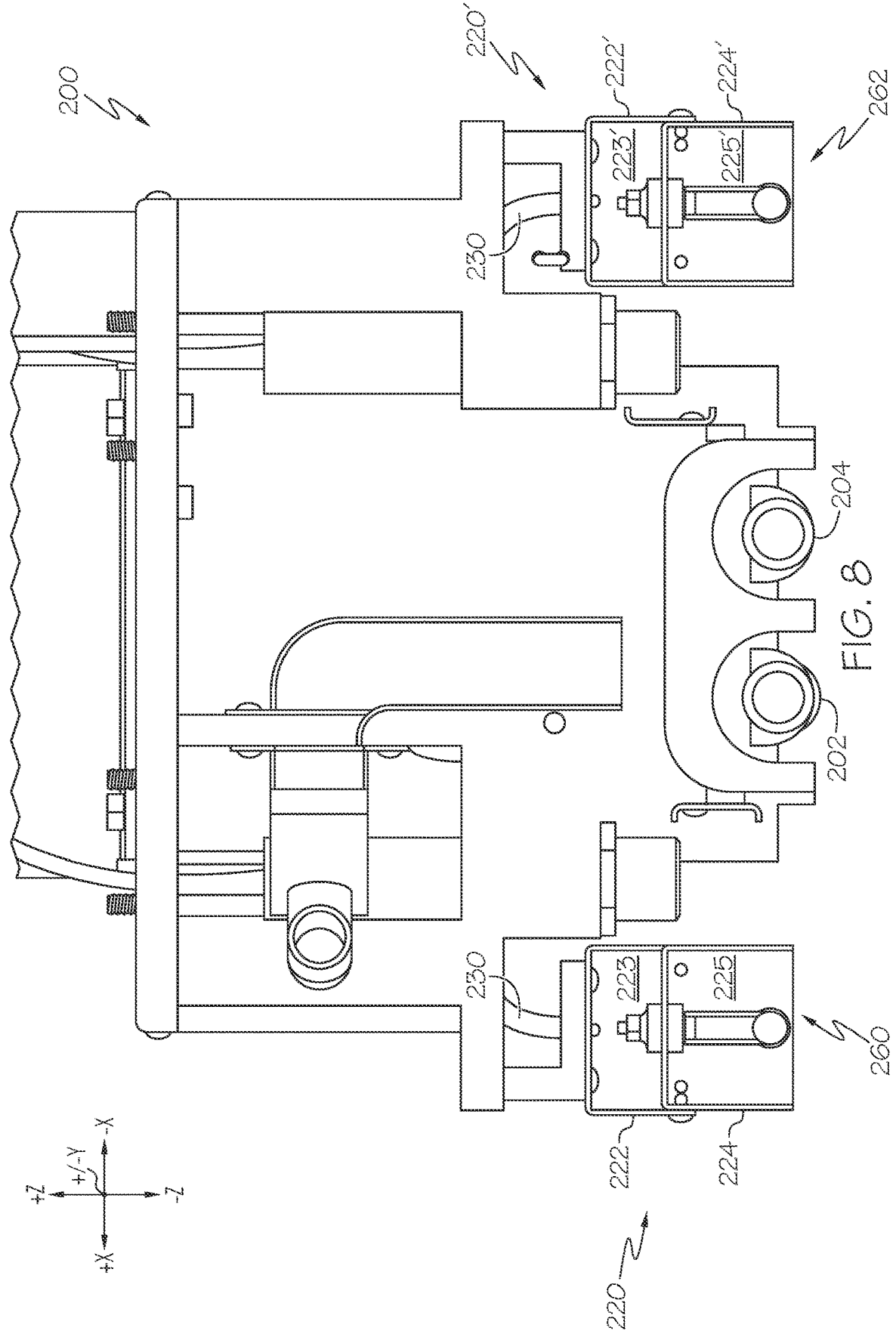
FIG. 8 schematically depicts a section view of a recoat assembly including a first housing assembly and a second housing assembly, according to one or more embodiments shown and described herein.

Referring to FIG. 8, in some embodiments, the first energy source 260 and the second energy source 262 are positioned on opposite sides of the first and second rollers 202, 204 (i.e., in the −X-direction as depicted). In these embodiments, the first energy source 260 may be at least partially enclosed within a first housing assembly 220 including a first duct 223 in communication with the air distribution system 230 and a first energy source enclosure 225, as described above. However, in the embodiment depicted in FIG. 8, the second energy source 262 is at least partially enclosed within a second housing assembly 200′ that is separate from the first housing assembly 220. The second housing assembly 200′ may include a second upper housing 222′ that defines a second duct 223′, and a second lower housing 224′ that defines a second energy source enclosure 225′. In embodiments, the second duct 223′ may be in communication with the air distribution system 230, and the second housing assembly 200′ operate in a similar manner to the housing assembly 220 described above and depicted in FIGS. 5 and 6 to transfer and distribute energy from the second energy source 262 through forced convection.

Figure 9:
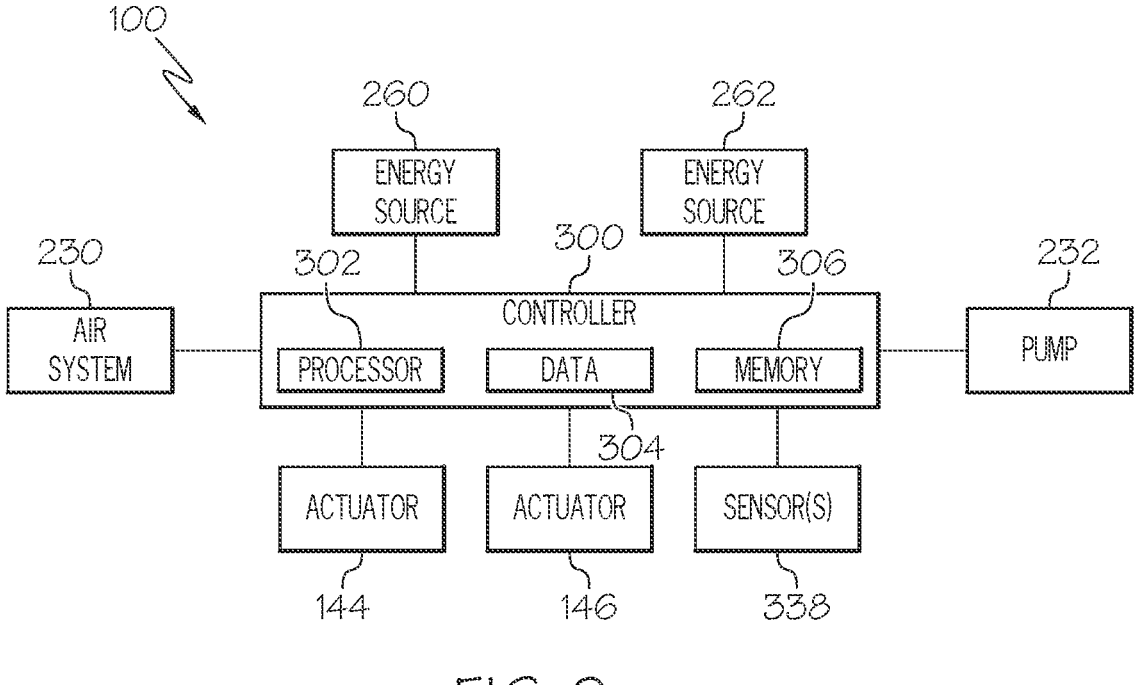
FIG. 9 schematically depicts a control diagram of the additive manufacturing system of FIG. 1, according to one or more embodiments shown and described herein.

Referring to FIG. 9, an example control diagram for the additive manufacturing system 100. As illustrated, the additive manufacturing system 100 includes a controller 300 including a processor 302, a data storage component 304, and/or a memory component 306. The memory component 306 may be configured as volatile and/or nonvolatile memory and as such, may include random access memory (including SRAM, DRAM, and/or other types of RAM), flash memory, secure digital (SD) memory, registers, compact discs (CD), digital versatile discs (DVD), and/or other types of non-transitory computer-readable mediums. Depending on the particular embodiment, these non-transitory computer-readable mediums may reside within the controller 300 and/or external to the controller 300.

The memory component 306 may store operating logic, analysis logic, and communication logic in the form of one or more computer readable and executable instruction sets. The analysis logic and the communication logic may each include a plurality of different pieces of logic, each of which may be embodied as a computer program, firmware, and/or hardware, as an example. A local interface may also be included in the controller 300, and may be implemented as a bus or other communication interface to facilitate communication among the components of the controller 300.

The processor 302 may include any processing component operable to receive and execute instructions (such as from a data storage component 304 and/or the memory component 306). It should be understood that while the components in FIG. 9 are illustrated as residing within the controller 300, this is merely an example, and in some embodiments, one or more of the components may reside external to the controller 300. It should also be understood that, while the controller 300 is illustrated as a single device, this is also merely an example.

In embodiments, the controller 300 is communicatively coupled to one or more components of the additive manufacturing system. For example, in the embodiment depicted in FIG. 8, the controller 30 is communicatively coupled to the first energy source 260, the second energy source 262, the air distribution system 230, the recoat assembly transverse actuator 144, and one or more roller actuators 146.

The controller 300 may send signals to the first energy source 260 and/or the second energy source 262 that cause the first energy source 260 and/or the second energy source 262 to emit energy, irradiating build material 31 (FIG. 1) positioned beneath the first energy source 260 and/or the second energy source 262. In some embodiments, the controller 300 may further send signals to the first energy source 260 and/or the second energy source 262 that can change an intensity of the energy emitted by the first energy source 260 and/or the second energy source 262.

The controller 300 may send signals to the air distribution system 230 that causes the air distribution system 230 to induce gas flow to the first energy source 260 and/or the second energy source 262, as described above. For example, the controller 300 may be communicatively coupled to the pump 232 or the like that induces the flow of gas through the air distribution system 230. In some embodiments, the controller 300 may send signals to the air distribution system 230 that changes a volume and/or velocity of the flow of gas through the air distribution system.

In embodiments, the controller 300 may send signals to the recoat assembly transverse actuator 144 causing the recoat assembly transverse actuator 144 to move the recoat assembly 200 (FIG. 1) along the working axis 116 (FIG. 1).

In some embodiments, the controller 300 may send signals to the one or more roller actuators 146 that are coupled to and cause the one or more roller actuators 146 to rotate the first roller 202 (FIG. 4) and/or the second roller 204 (FIG. 4).

In some embodiments, one or more sensors 338 are communicatively coupled to the controller 300. The one or more sensors 338 may one or more temperature sensors such as thermocouples, resistance temperature detectors (RTDs), infrared pyrometers, or the like. The one or more sensors 338 may send signals to the controller 300 indicative of detected temperatures at various locations within the additive manufacturing system 100. In embodiments, the controller 300 may direct various components of the additive manufacturing system 100 (e.g., the first energy source 260, the second energy source 262, the recoat assembly transverse actuator 144, the air distribution system 230, etc.) in response to temperatures detected via the one or more sensors 338.

Referring to FIGS. 1, 10, 11, and 12, in some embodiments, the recoat assembly 200 may include a powder plow assembly 314 that may assist in moving excess build material 31 (FIG. 1) and/or debris positioned in the path of the recoat assembly 200 as the recoat assembly 200 moves along the working axis 116. For example, in some circumstances, the recoat assembly 200 may move more build material 31 (FIG. 1) than is necessary to achieve a desired layer thickness, as described in greater detail herein. In some circumstances, debris may be positioned in the path of the recoat assembly 200. The powder plow assembly 314 may move this debris or excess build material 31 (FIG. 1) such that the debris or excess build material 31 does not contact or interfere with components of the recoat assembly 200. For example, in some embodiments, the one or more sensors 338 may be positioned inward (e.g., in the –x-direction as depicted) of the powder plow assembly 314. As the recoat assembly moves, for example in the +x-direction as depicted, the powder plow assembly 314 may contact and move build material 31 (FIG. 1) and/or debris that would otherwise contact and may damage or interfere with the one or more sensors 338. Although the powder plow 316 is shown as only being on one side of the recoat assembly 200, it should be appreciated that, in embodiments, a second powder plow assembly 314 may be provided on the opposite side of the recoat assembly (e.g., in the x-direction as depicted).

The powder plow 316 may be formed from any suitable material with a wear resistant low coefficient of friction coating. As a non-limiting example, the powder plow 316 may be formed from electroless nickel with co-deposited polytetrafluoroethylene (PTFE) or may be electropolished.

Figure 10:
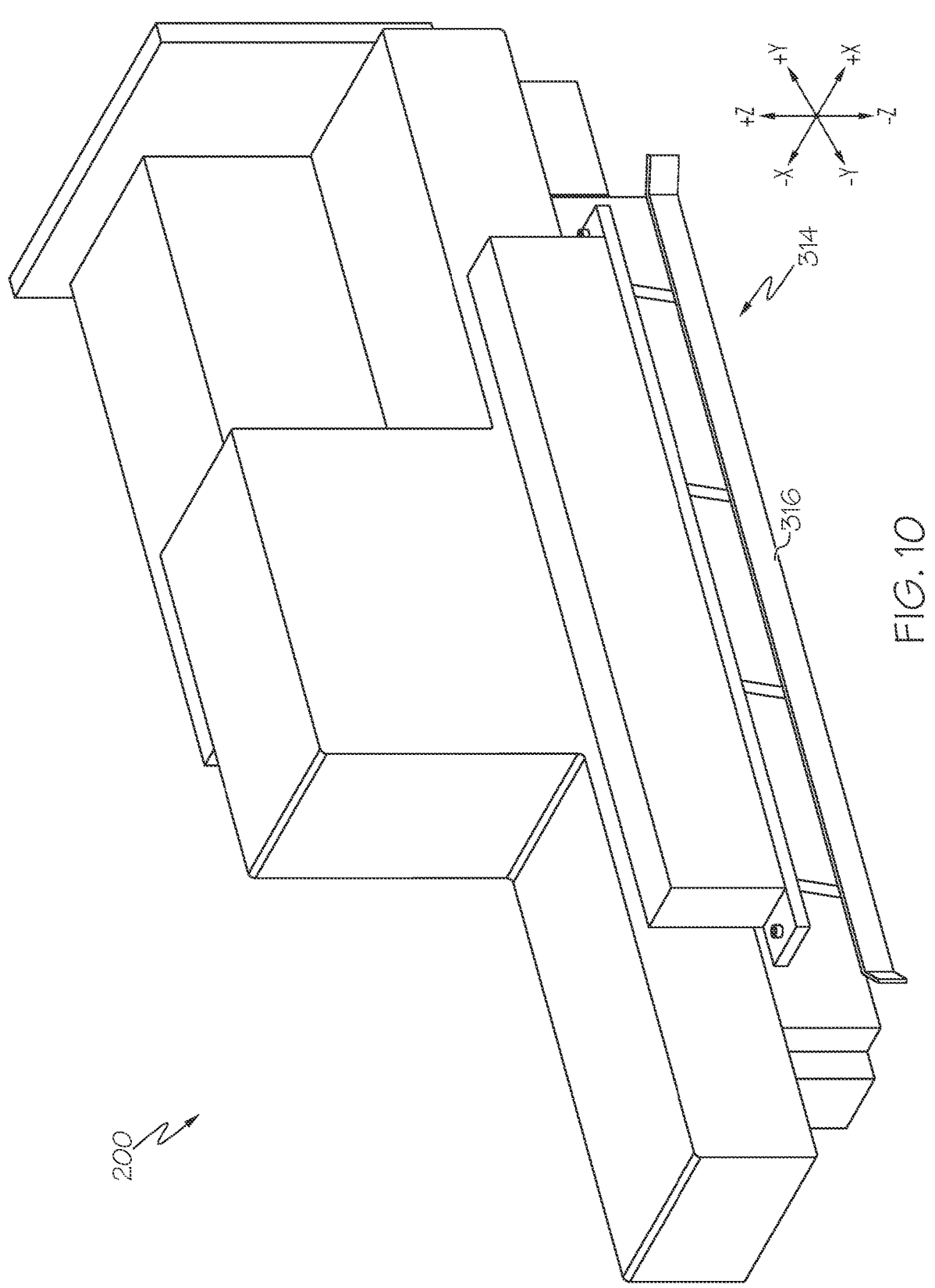
FIG. 10 schematically depicts a perspective view of a recoat assembly including a powder plow assembly, according to one or more embodiments shown and described herein.
Figure 11:
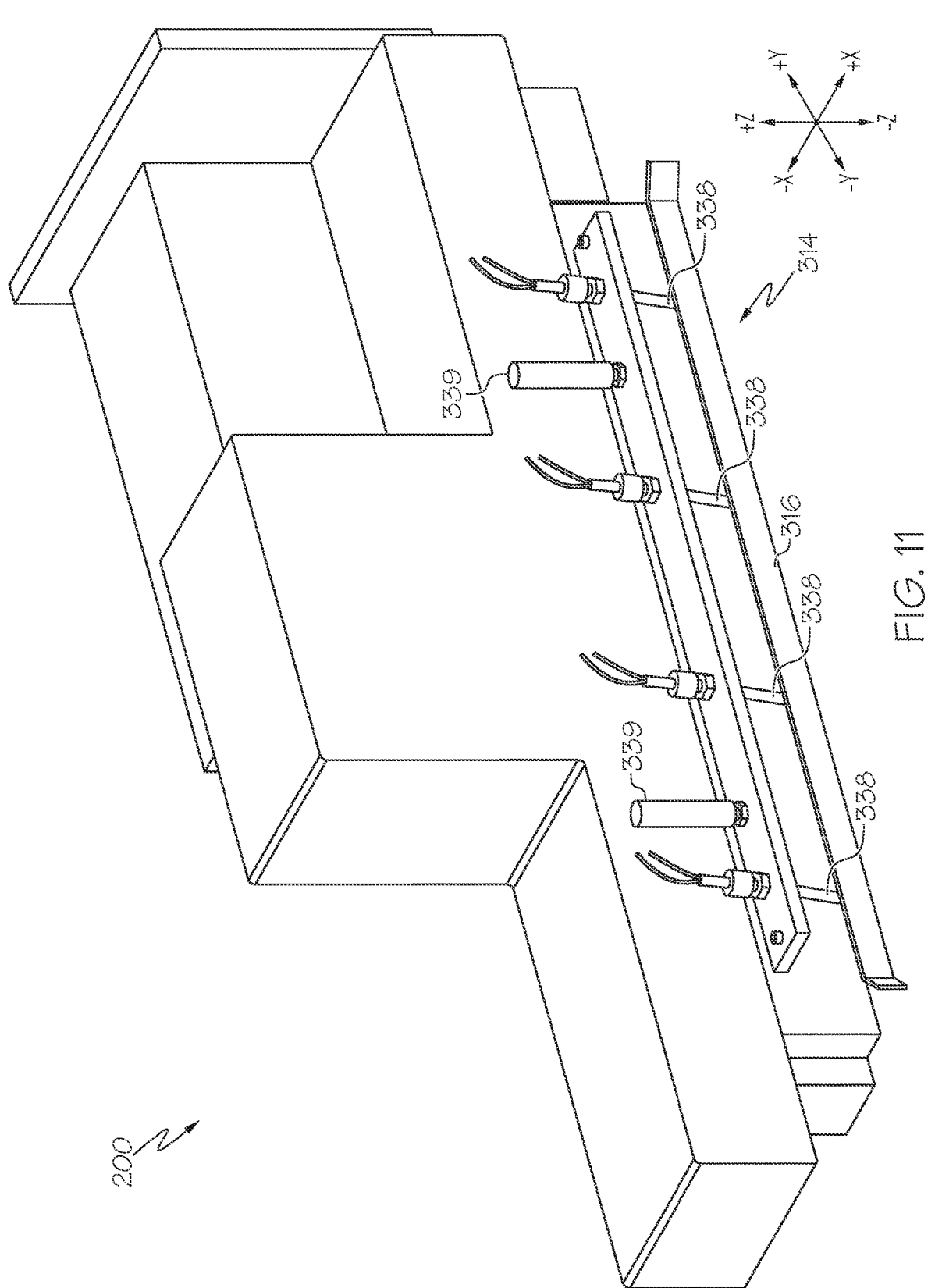
FIG. 11 schematically depicts a perspective view of the powder plow assembly of FIG. 10 with a powder plow housing removed, according to one or more embodiments shown and described herein.
Figure 12:
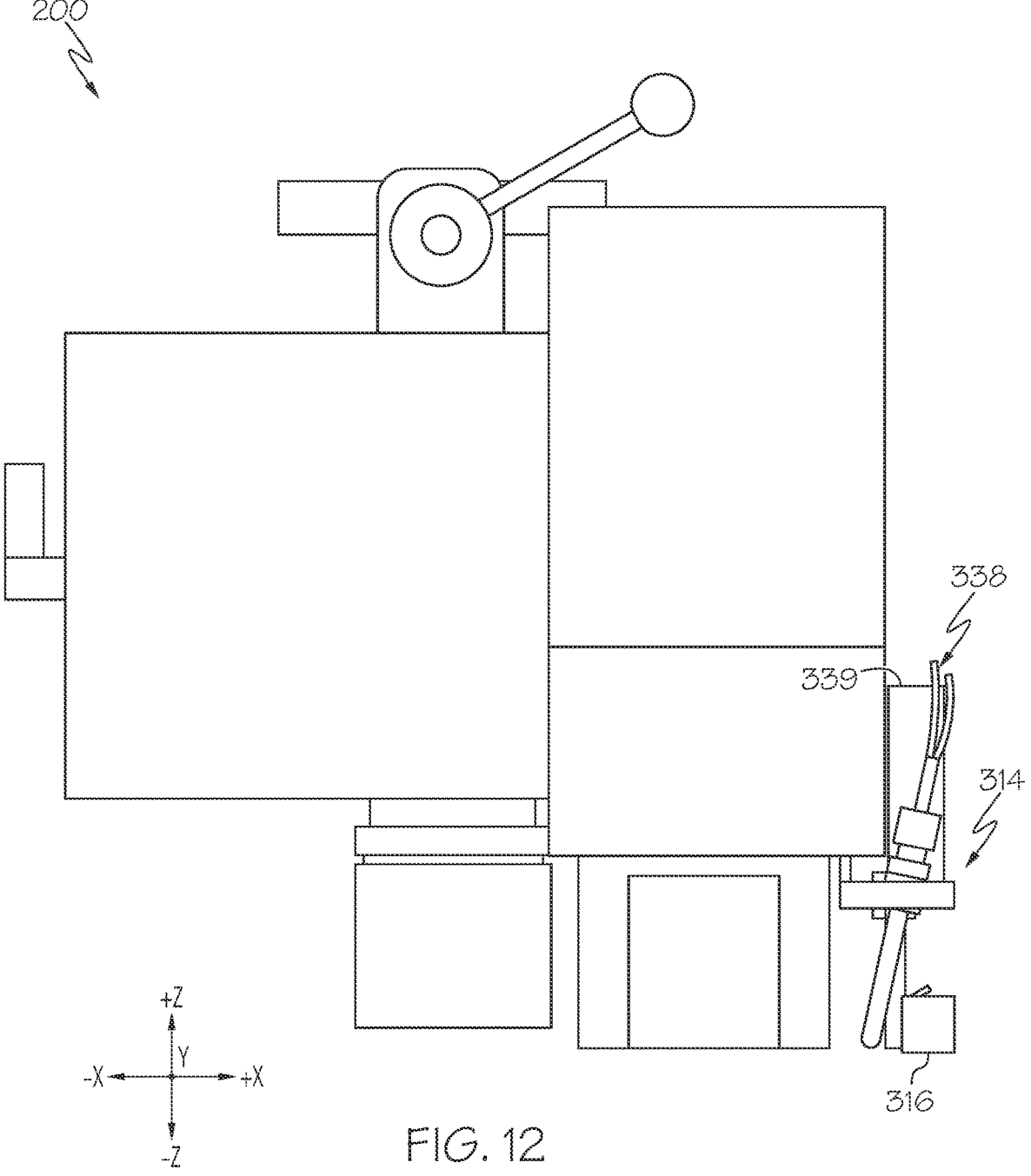
FIG. 12 schematically depicts a side view of the recoat assembly and powder plow assembly of FIG. 11, according to one or more embodiments shown and described herein.

Referring now to FIGS. 10-12, a perspective view and a side view of the powder plow assembly 314 are depicted with a cover of the powder plow assembly 314 removed, respectively. In embodiments, the powder plow assembly 314 includes at least one actuator 339 for moving the powder plow 316 between a raised position and a lowered position (e.g., moving the powder plow 316 in the +/–Z-direction as depicted in the figure). Any suitable actuators may be used such as, for example, electric actuators, pneumatic actuators, hydraulic actuators, spring actuators, or any other suitable actuating device.

Methods for operating the recoat assembly 200 will now be described with reference to the appended drawings. In some embodiments, the controller 300 may direct the recoat assembly 200 to perform the methods described below.

Figure 13:
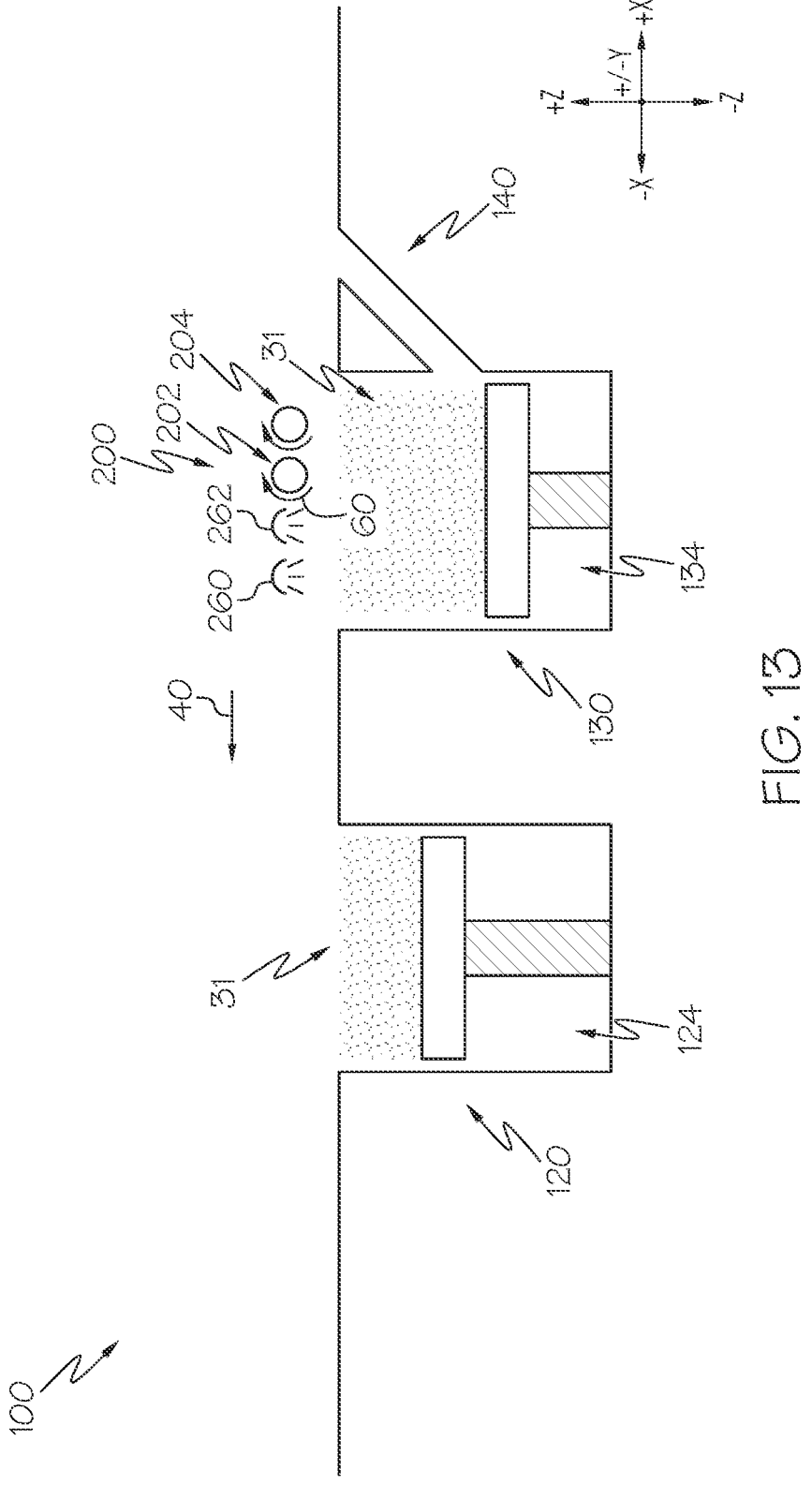
FIG. 13 schematically depicts a recoat assembly moving build material to a build area, according to one or more embodiments shown and described herein.

Referring to FIG. 13 a side view of the recoat assembly 200 is depicted. The recoat assembly 200 may move in a coating direction 40 over the supply receptacle 134 including the build material 31. The recoat assembly 200 may contact the build material 31 in the supply receptacle 134 within the supply receptacle 134 with the powder spreading member, which in the embodiment depicted in FIG. 13 includes the first roller 202 and/or the second roller 204. In some embodiments, the first roller 202 and/or the second roller 204 may be rotated, for example in a counter-rotation direction 60 such that a bottom of the first roller 202 and/or the second roller 204 moves in the coating direction 40. As noted above, in some embodiments, the powder spreading member may include a doctor blade or the like.

The recoat assembly, via the powder spreading member (e.g., the first roller 202 and/or the second roller 204), moves build material 31 in the coating direction 40 from the supply receptacle 134 to a build area (e.g., the build receptacle 124) which is spaced apart from the supply receptacle 134. In embodiments, the powder spreading member (e.g., the first roller 202 and/or the second roller 204) deposits a second layer of build material 31 over an initial layer of build material 31 positioned in the build receptacle 124, for example as the result of a previous cycle of the recoat assembly 200.

Figure 14:
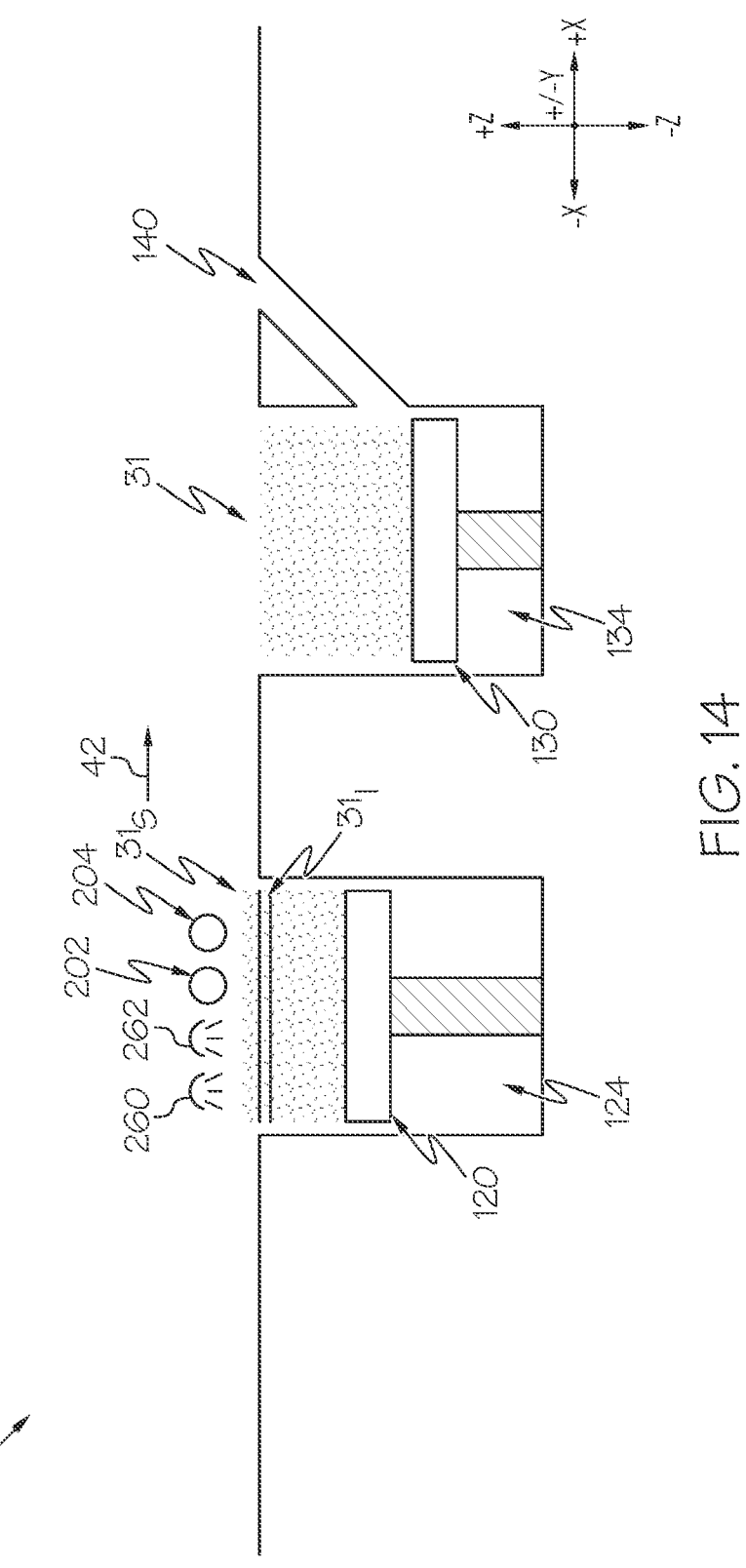
FIG. 14 schematically depicts a recoat assembly moving build material from the build area to a supply receptacle, according to one or more embodiments shown and described herein.

For example and referring to FIG. 14, the powder spreading member (e.g., the first roller 202 and/or the second roller 204) may deposit a second layer of build material $31_S$ over an initial layer of build material $31_1$ previously deposited by the powder spreading member in the build receptacle 124.

In embodiments, the powder spreading member (e.g., the first roller 202 and/or the second roller 204) contacts the second layer of build material $31_S$, and moves at least a portion of the second layer of build material $31_S$ in a return direction 42 back to the supply receptacle 134. The powder spreading member (e.g., the first roller 202 and/or the second roller 204) then deposits at least a portion of the second layer of build material $31_S$ into the supply receptacle 134. In some embodiments, the at least a portion of the second layer of build material $31_S$ can be deposited directly in the supply receptacle 134 by the powder spreading member (e.g., the first roller 202 and/or the second roller 204). In some embodiments, the additive manufacturing system 100 may include a return chute 140 in communication with the supply receptacle 134, and the at least a portion of the second layer of build material $31_S$ may be deposited within the return chute 140.

Accordingly, in embodiments an initial thickness of the second layer of build material $31_S$ may be greater than a final thickness of the build material $31_S$ that remains after the at least a portion of the second layer of build material $31_S$ is moved back to the supply receptacle 134 by the recoat assembly 200. By initially depositing an excess amount of build material 31 to form the second layer of build material $31_S$, voids within the second layer of build material $31_S$ can be reduced. Further, by initially depositing an excess amount of build material 31 to form the second layer of build material 31$_S$, forces applied to the initial layer of build material 31$_1$ and/or cured binder 50 (FIG. 1) within the initial layer of build material 31$_1$ can be reduced. Additionally, by returning excess build material 31 to the supply receptacle 134 (either directly or via the return chute 140), the excess build material 31 can be readily re-used in subsequent layers of build material 31 deposited in the build receptacle 124.

In some embodiments, the first energy source 260 and/or the second energy source 262 may irradiate the initial layer of build material 31$_1$ and/or the second layer of build material 31$_S$ positioned within the build area (e.g., the build receptacle 124).

Based on the foregoing, it should be understood that embodiments described herein are directed to additive manufacturing systems that generally include a recoat assembly for spreading build material in a build area. The recoat assembly may move build material from a build supply to the build area in sequential layers. In embodiments, the recoat assembly may move the excess build material back to the build supply such that the excess build material may be utilized in subsequent layers. In some embodiments, the recoat assembly and/or print assembly may include one or more energy sources that can apply energy to the build material. In embodiments described herein, an air distribution system that may distribute heat generated by the one or more energy sources by forced convection.

It will be apparent to those skilled in the art that various modifications and variations can be made to the embodiments described herein without departing from the spirit and scope of the claimed subject matter. Thus it is intended that the specification cover the modifications and variations of the various embodiments described herein provided such modification and variations come within the scope of the appended claims and their equivalents.

Further aspects of the present disclosure are provided in the following clauses:

1. A method for forming an object, the method comprising moving an assembly comprising an energy source, heating an initial layer of build material positioned in a build area via forced convection around the energy source of the assembly, and spreading build material on the build area, thereby depositing a second layer of build material over the initial layer of build material.

2. The method of any preceding clause, wherein the assembly is a recoat assembly comprising a powder spreading member.

3. The method of any preceding clause, wherein heating the initial layer of build material positioned in the build area further comprises heating the initial layer of build material via radiation emitted from the energy source.

4. The method of any preceding clause, wherein heating the build area via forced convection comprises passing a gas through a duct that is in communication with an energy source enclosure that at least partially encloses the energy source.

5. The method of any preceding clause, wherein the energy source is a first energy source, and wherein heating the initial layer of build material via force convection comprises passing a gas over the first energy source and a second energy source.

6. The method of any preceding clause, wherein passing the gas over the first energy source and the second energy source comprises passing the gas to an energy source enclosure that at least partially encloses the first energy source and the second energy source.

7. The method of any preceding clause, wherein passing the gas over the first energy source and the second energy source comprises passing the gas to first energy source enclosure that at least partially encloses the first energy source and passing the gas to a second energy source enclosure that at least partially encloses the second energy source.

8. A method for forming an object, the method comprising moving a recoat assembly in a coating direction over a supply receptacle comprising build material, wherein the recoat assembly comprises a powder spreading member, contacting the build material in the supply receptacle with the powder spreading member, irradiating, with an energy source coupled to the recoat assembly, an initial layer of build material positioned in a build receptacle, and passing a gas over the energy source, thereby heating the initial layer of build material positioned in the build receptacle via forced convection.

9. The method of any preceding clause, further comprising moving the build material in the coating direction with the powder spreading member to the build receptacle, thereby depositing a second layer of build material over the initial layer of build material, contacting the second layer of build material with the powder spreading member, moving at least a portion of the second layer of build material in a return direction to the supply receptacle, and depositing the at least a portion of the second layer of build material in the supply receptacle.

10. The method of any preceding clause, further comprising, subsequent to moving the second layer of build material, irradiating, with the energy source, the second layer of build material within the build receptacle.

11. The method of any preceding clause, further comprising passing a gas over the energy source, thereby heating the second layer of build material within the build receptacle via forced convection.

12. The method of any preceding clause, wherein depositing the at least a portion of the second layer of build material in the supply receptacle comprises depositing the at least a portion of the second layer of build material in a return chute in communication with the supply receptacle.

13. The method of any preceding clause, wherein the powder spreading member comprises one or more rollers.

14. An additive manufacturing system comprising at least one of a print assembly and a recoat assembly, a housing assembly coupled to the at least one of the print assembly and the recoat assembly, the housing assembly comprising an energy source enclosure, an energy source positioned at least partially within the energy source enclosure, and an air distribution system in communication with the energy source enclosure, wherein the air distribution system comprises a pump structurally configured to pass a gas to the energy source enclosure to transfer thermal energy from the energy source.

15. The system of any preceding clause, wherein the housing assembly further comprises an upper housing defining a duct in communication with the energy source enclosure.

16. The system of any preceding clause, wherein the upper housing defines one or more vents in communication with the duct.

17. The system of any preceding clause, further comprising a controller communicatively coupled to the air distribution system, the controller comprising a processor and a computer readable and executable instruction set, which when executed, causes the processor to direct the air distribution system to pass the gas to the duct.

18. The system of any preceding clause, wherein the housing assembly is a first housing assembly, and system further comprises a second housing assembly coupled to the at least one of the recoat assembly and the print assembly, the second housing assembly spaced apart from the first housing assembly and comprising a second energy source enclosure, and a second energy source positioned at least partially within the second energy source enclosure.

19. The system of any preceding clause, wherein the second housing assembly comprises a second upper housing defining a second duct in communication with the second energy source enclosure.

20. The system of any preceding clause, further comprising a powder plow assembly coupled to the at least one of the recoat assembly and the print assembly.

What is claimed is:
1. A method for forming an object, the method comprising:
    moving at least one of a print assembly and a recoat assembly comprising an energy source, the energy source provided at least partially within an energy source enclosure of a housing assembly coupled to the at least one of the print assembly and the recoat assembly, the housing assembly including an upper housing defining a duct in communication with the energy source, and a plate separating the upper housing from the energy source enclosure, a plurality of apertures formed in the plate between the upper housing and the energy source enclosure;
    heating, via a pump of an air distribution system in communication with the energy source enclosure, an initial layer of build material positioned in a build area via forced convection around the energy source of the at least one of a print assembly and a recoat assembly, the pump of the air distribution system configured to pass a gas to the energy source enclosure to transfer thermal energy from the energy source; and
    spreading build material on the build area, thereby depositing a second layer of build material over the initial layer of build material.

2. The method of claim 1, wherein the at least one of a print assembly and the recoat assembly is a recoat assembly comprising a powder spreading member.

3. The method of claim 1, wherein heating the initial layer of build material positioned in the build area further comprises heating the initial layer of build material via radiation emitted from the energy source.

4. The method of claim 1, wherein heating the build area via forced convection comprises passing a gas through the duct that is in communication with an energy source enclosure that at least partially encloses the energy source.

5. The method of claim 1, wherein the energy source is a first energy source, and wherein heating the initial layer of build material via force convection comprises passing a gas over the first energy source and a second energy source.

6. The method of claim 5, wherein passing the gas over the first energy source and the second energy source comprises passing the gas to an energy source enclosure that at least partially encloses the first energy source and the second energy source.

7. The method of claim 5, wherein passing the gas over the first energy source and the second energy source comprises passing the gas to first energy source enclosure that at least partially encloses the first energy source and passing the gas to a second energy source enclosure that at least partially encloses the second energy source.

8. A method for forming an object, the method comprising:
    moving at least one of a print assembly and a recoat assembly in a coating direction over a supply receptacle comprising build material, wherein the at least one of a print assembly and the recoat assembly comprises a powder spreading member;
    contacting the build material in the supply receptacle with the powder spreading member;
    irradiating, with an energy source coupled to the at least one of a print assembly and the recoat assembly, an initial layer of build material positioned in a build receptacle, the energy source provided at least partially within an energy source enclosure of a housing assembly coupled to the at least one of the print assembly and the recoat assembly, the housing assembly including an upper housing defining a duct in communication with the energy source, and a plate separating the upper housing from the energy source enclosure, a plurality of apertures formed in the plate between the upper housing and the energy source enclosure; and
    passing a gas, via a pump of an air distribution system in communication with the energy source enclosure, to the energy source enclosure to transfer thermal energy from the energy source, thereby heating the initial layer of build material positioned in the build receptacle via forced convection.

9. The method of claim 8, further comprising:
    moving the build material in the coating direction with the powder spreading member to the build receptacle, thereby depositing a second layer of build material over the initial layer of build material;
    contacting the second layer of build material with the powder spreading member;
    moving at least a portion of the second layer of build material in a return direction to the supply receptacle; and
    depositing the at least a portion of the second layer of build material in the supply receptacle.

10. The method of claim 9, further comprising, subsequent to moving the second layer of build material, irradiating, with the energy source, the second layer of build material within the build receptacle.

11. The method of claim 10, further comprising passing a gas over the energy source, thereby heating the second layer of build material within the build receptacle via forced convection.

12. The method of claim 9, wherein depositing the at least a portion of the second layer of build material in the supply receptacle comprises depositing the at least a portion of the second layer of build material in a return chute in communication with the supply receptacle.

13. The method of claim 8, wherein the powder spreading member comprises one or more rollers.

14. An additive manufacturing system comprising:
    at least one of a print assembly and a recoat assembly;

a housing assembly coupled to the at least one of the print assembly and the recoat assembly, the housing assembly comprising:

an energy source enclosure;

an upper housing defining a duct in communication with the energy source enclosure; and a plate separating the energy source enclosure from the upper housing, a plurality of apertures formed in the plate between the upper housing and the energy source enclosure;

an energy source positioned at least partially within the energy source enclosure; and an air distribution system in communication with the energy source enclosure, wherein the air distribution system comprises a pump structurally configured to pass a gas to the energy source enclosure to transfer thermal energy from the energy source.

15. The system of claim 14, wherein the upper housing defines one or more vents in communication with the duct.

16. The system of claim 14, further comprising a controller communicatively coupled to the air distribution system, the controller comprising a processor and a computer readable and executable instruction set, which when executed, causes the processor to direct the air distribution system to pass the gas to the duct.

17. The system of claim 14, wherein the housing assembly is a first housing assembly, and system further comprises:

a second housing assembly coupled to the at least one of the recoat assembly and the print assembly, the second housing assembly spaced apart from the first housing assembly and comprising a second energy source enclosure; and a second energy source positioned at least partially within the second energy source enclosure.

18. The system of claim 17, wherein the second housing assembly comprises a second upper housing defining a second duct in communication with the second energy source enclosure.

19. The system of claim 14, further comprising a powder plow assembly coupled to the at least one of the recoat assembly and the print assembly.

* * * * *